US012713262B2

(12) United States Patent
Hirzallah et al.

(10) Patent No.: US 12,713,262 B2
(45) Date of Patent: Aug. 18, 2026

(54) SIGNALING AND REPORTING FOR UE-SIDE ML DISPLACEMENT POSITIONING

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Xiaoxia Zhang, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 515 days.

(21) Appl. No.: 18/181,400

(22) Filed: Mar. 9, 2023

(65) Prior Publication Data

US 2024/0306022 A1 Sep. 12, 2024

(51) Int. Cl.
*H04W 24/10* (2009.01)
*H04W 64/00* (2009.01)

(52) U.S. Cl.
CPC .......... *H04W 24/10* (2013.01); *H04W 64/00* (2013.01)

(58) Field of Classification Search
CPC ... H04W 24/10; H04W 64/00; H04W 64/006; H04W 4/027; H04W 64/003; H04W 72/23; H04W 72/21; H04W 24/02; H04W 72/0446; H04W 72/046; H04W 72/04; H04W 72/0453; H04W 36/0083; H04W 8/08; H04W 88/16; H04W 72/1273; H04W 72/044; H04W 52/0206; H04W 48/18; H04W 4/50; H04W 72/542; H04W 52/223; H04W 28/0268; H04W 16/18;
(Continued)

(56) References Cited

U.S. PATENT DOCUMENTS 10,908,299 B1 * 2/2021 Tadayon ............... H04W 4/027
2021/0345134 A1 * 11/2021 Ottersten ............. H04W 16/22
(Continued)

FOREIGN PATENT DOCUMENTS

WO 2022155244 A2 7/2022
WO 2022241350 A1 11/2022

OTHER PUBLICATIONS

International Search Report and Written Opinion—PCT/US2024/018395—ISA/EPO—Oct. 18, 2024.
(Continued)

*Primary Examiner* — Nimesh Patel
(74) *Attorney, Agent, or Firm* — Procopio, Cory, Hargreaves & Savitch LLP

(57) ABSTRACT

Aspects presented herein may enable a UE or a location server to estimate the displacement of the UE based on measuring wireless signals, such that the UE may perform accurate displacement estimation accurately without using sensors (e.g., IMUs). In one aspect, a UE receives, from a network entity, a request to report information associated with ML-based displacement positioning. The UE transmits, for the network entity based on the request, the information associated with the ML-based displacement positioning. The UE receives, from the network entity based on the information, a configuration for the ML-based displacement positioning. The UE receives, from at least one network node based on the configuration, a set of RSs associated with the ML-based displacement positioning.

19 Claims, 14 Drawing Sheets

(58) Field of Classification Search

CPC ..... H04W 16/22; H04W 16/24; H04W 24/04; H04W 28/06; H04W 36/0061; H04W 4/025; H04W 4/38; H04W 48/12; H04W 72/541; H04W 72/543; H04W 72/563; H04W 88/18; H04W 48/08; H04W 72/20; H04W 72/51; H04W 72/25; H04L 5/005; H04L 5/0048; H04L 1/0026; H04L 5/00; H04L 2012/5672; H04L 2012/5675; H04L 5/0023; H04L 5/0053; H04L 5/0094; H04L 41/0686; H04L 41/16; H04L 25/0254; H04L 63/10; H04L 41/0613; H04L 41/142; H04L 41/5009; H04L 43/065; H04L 1/0031; H04L 25/03165; H04L 25/0204; H04L 41/147; H04L 47/805; H04L 5/0051; H04L 5/0055; H04L 25/0224; G01S 5/0236; G01S 5/10; G01S 5/0278; G01S 5/0036; G01S 5/017; G01S 5/0205; G01S 5/021; G01S 5/02521; G01S 5/02528; G01S 5/0294; G01S 7/415; G01S 7/417; G01S 1/042; G01S 5/0252; G01S 11/02; G01S 13/876; G01S 19/01; G01S 19/46; G01S 2013/9316; G01S 5/011; G01S 5/02525; G01S 5/0273; G01S 5/0009; G01S 5/0244; G01S 5/0268; G01S 5/02523; G01S 19/45; G01S 2205/008; G01S 19/48; G01S 5/0063; G01S 5/0263; G01S 5/02955; G01S 13/02; G01S 5/0246; G01S 7/003; G01S 13/003; G01S 13/36; G01S 13/46; G01S 2013/462; G01S 5/0027; G01S 5/0242; G01S 5/0264; G06N 20/00; G06N 3/08; G06N 20/10; G06N 7/01; G06N 3/0455; G06N 20/20; G06N 3/045; G06N 3/0985; G06N 3/047; G06N 3/00; G06N 3/0464; G06N 5/04; H04B 17/318; H04B 17/27; H04B 7/06952; H04B 7/06; H04B 17/336; H04B 7/0626; H04B 17/328; H04B 17/373; H04B 7/0632; H04B 17/3912; H04B 7/0695; H04B 17/3913; H04B 17/345; H04B 7/0617; H04B 17/364; H04B 7/06966; H04B 1/48; H04B 17/391; Y02D 30/70

See application file for complete search history.

(56) References Cited

U.S. PATENT DOCUMENTS

2022/0015059 A1* 1/2022 Tenny .................... G01S 1/042
2022/0312151 A1 9/2022 Yerramalli et al.
2024/0147407 A1* 5/2024 Zorgui .................. G06N 3/088
2024/0295625 A1* 9/2024 Hasegawa ............ G01S 5/0263
2024/0337720 A1* 10/2024 Hirzallah ............ H04B 17/318

OTHER PUBLICATIONS

Partial International Search Report—PCT/US2024/018395—ISA/EPO—Jul. 19, 2024.

* cited by examiner

One Frame (TDD)
10 ms
200
subframe
RB
slot
D D D D D D D D D D D D F U
subcarrier
R
OFDM symbol
slot
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs One Frame (TDD)
10 ms
250
subframe
RB
slot
U U U U U U U U U U U U U U
subcarrier
OFDM symbol
slot
SRS
SRS Comb 0
SRS Comb 1
DMRS R

280
PUCCH
PUSCH

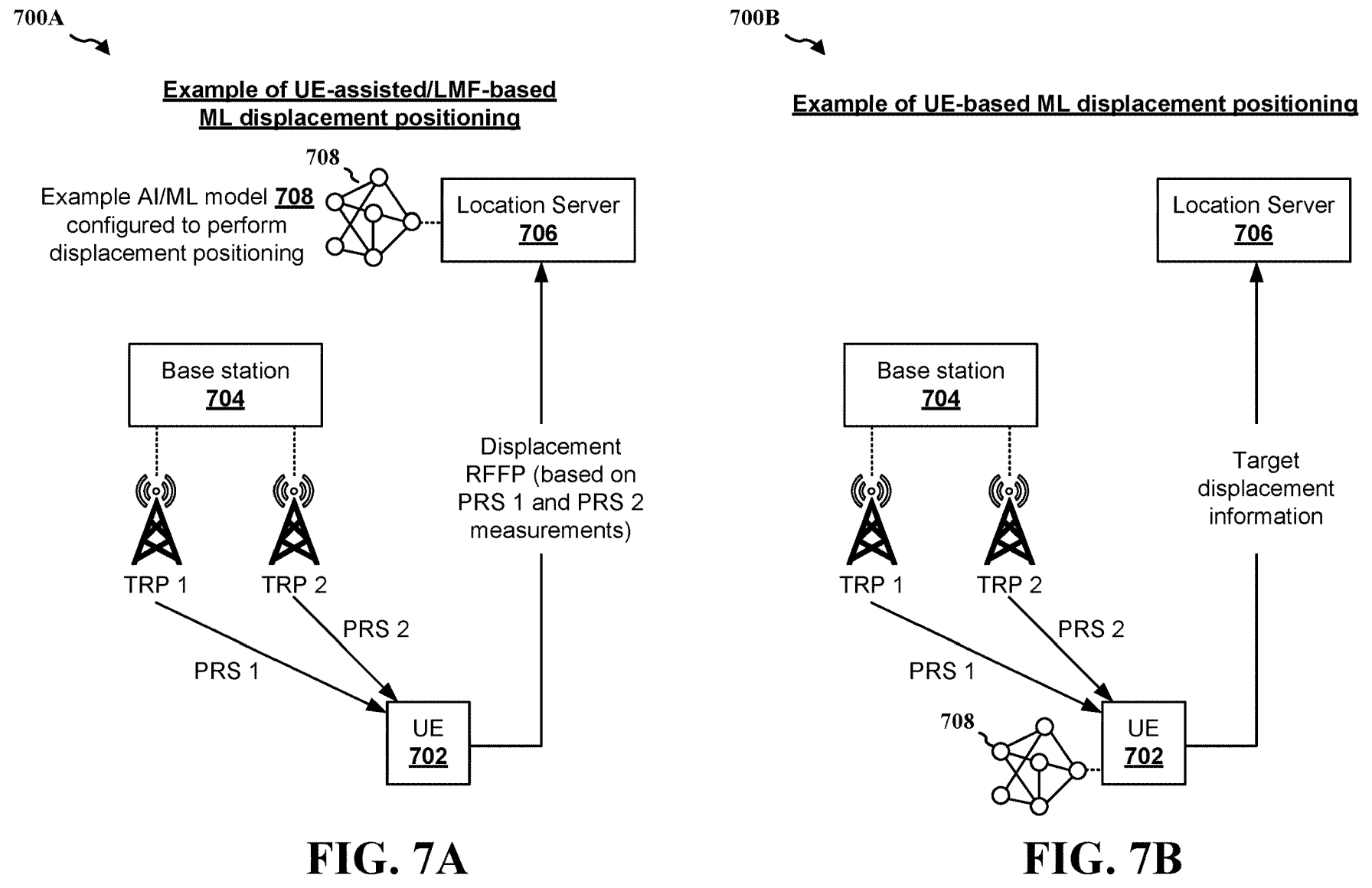

700A

Example of UE-assisted/LMF-based ML displacement positioning

Example AI/ML model 708 configured to perform displacement positioning

708

Location Server 706

Base station 704

TRP 1

TRP 2

PRS 1

PRS 2

UE 702

Displacement RFFP (based on PRS 1 and PRS 2 measurements)

Example of UE-based ML displacement positioning

Location Server 706

Base station 704

TRP 1

TRP 2

PRS 1

PRS 2

UE 702

708

Target displacement information

FIG. 7B

SIGNALING AND REPORTING FOR UE-SIDE ML DISPLACEMENT POSITIONING

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a network entity, a request to report information associated with machine learning (ML)-based displacement positioning. The apparatus transmits, for the network entity based on the request, the information associated with the ML-based displacement positioning. The apparatus receives, from the network entity based on the information, a configuration for the ML-based displacement positioning. The apparatus receives, from at least one network node based on the configuration, a set of reference signals (RSs) associated with the ML-based displacement positioning.

In an aspect of the disclosure, a method, a computer-readable medium, and an apparatus are provided. The apparatus transmits, for a user equipment (UE), a request to report information associated with ML-based displacement positioning. The apparatus receives, from the UE based on the request, the information associated with the ML-based displacement positioning. The apparatus transmits, for the UE based on the information, a configuration for the ML-based displacement positioning. The apparatus receives, from the UE based on the configuration, a set of displacement radio frequency fingerprint positioning (RFFP) measurements or an estimated displacement of the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7A is a diagram illustrating an example of UE-assisted/network-based machine learning (ML) displacement positioning in accordance with various aspects of the present disclosure.

FIG. 7B is a diagram illustrating an example of UE-based ML displacement positioning in accordance with various aspects of the present disclosure.

DETAILED DESCRIPTION

Figure 1:
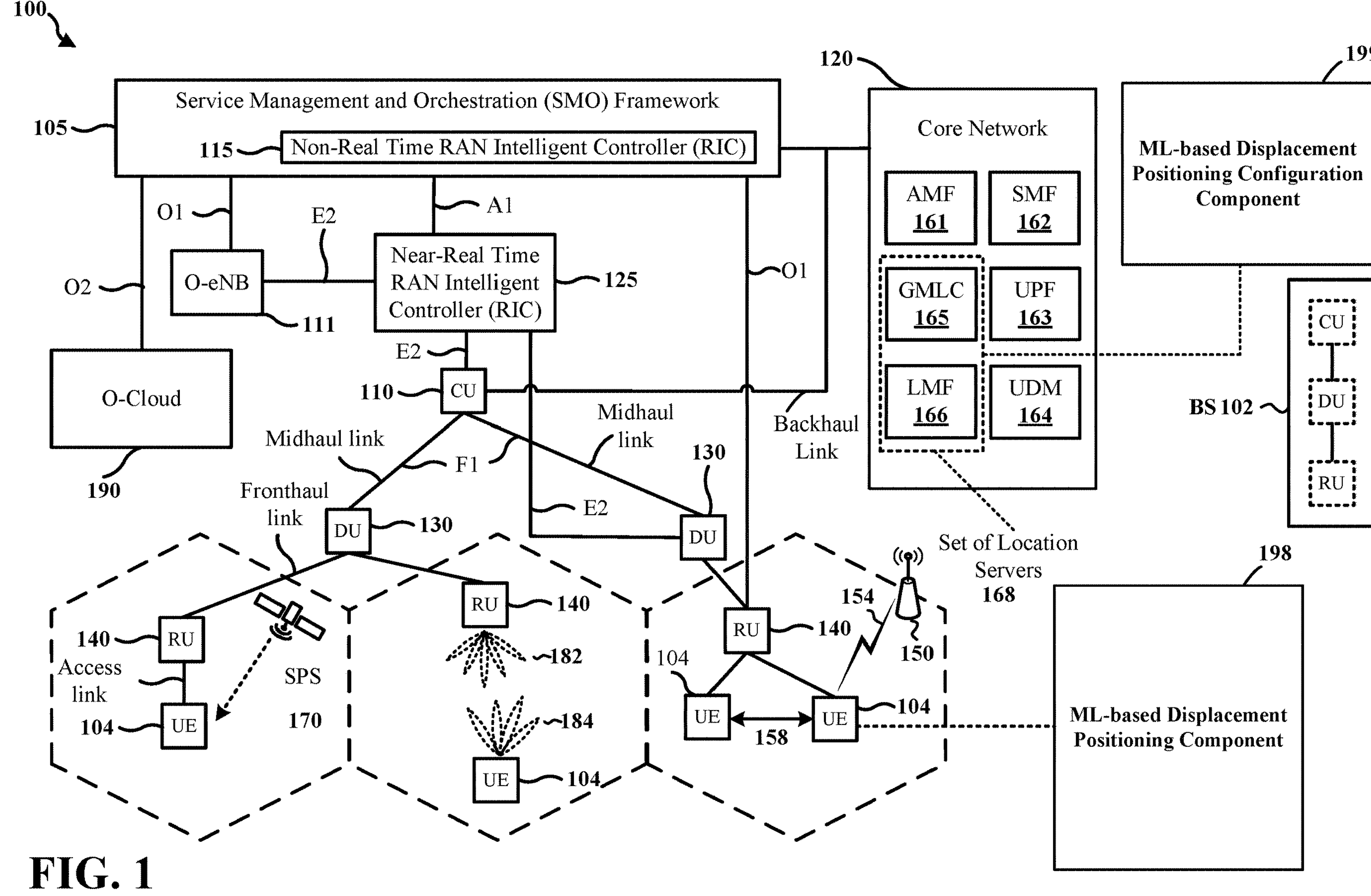
FIG. 1 is a diagram illustrating an example of a wireless communications system and an access network.

Aspects presented herein may enable a UE to estimate its displacement(s) based on measuring wireless signals (which may be referred to as displacement positioning), such that UEs without sensors (e.g., inertial measurement units (IMUs)) may also be able to accurately estimate its displacement (e.g., with certain specified accuracies). Aspects presented herein also provide signaling and reporting between a UE and a network entity (e.g., a base station, a location server, a location management function (LMF), etc.) which enables artificial intelligence (AI)/machine learning (ML) (AI/ML)-based displacement positioning at a UE side or at a network side. Thus, aspects presented herein may apply to both UE-assisted/LMF-based AI/ML displacement positioning and UE-based AI/ML displacement positioning.

By enabling the displacement of a UE to be measured based on wireless signals, the UE may not be specified to report measurements for two separate positioning occasions or compute two separate positionings (e.g., one at initial position and another one at the displaced position), which may reduce signaling overhead between the UE and the network entity (e.g., the location server, the LMF, etc.). Aspects presented herein may also enable training data to be generated for an AI/ML model that may be used for performing the displacement positioning (which may be referred to as AI/ML-based displacement positioning). In addition, the generation of the training data may also be applied to other types of AI/ML positioning methods, which may bootstrap different positioning label types (e.g., displacement and anchors). For example, an enhanced AI/ML estimated displacement may be leveraged to train other AI/ML positioning methods. Aspects presented herein may also enable a UE (or its sensor(s)) to provide an enhanced sensor output by fusing radio frequency fingerprint positioning (RFFP) estimated displacements with sensor output(s).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an ML-based displacement positioning component 198 that may be configured to receive, from a network entity, a request to report information associated with ML-based displacement positioning; transmit, for the network entity based on the request, the information associated with the ML-based displacement positioning; receive, from the network entity based on the information, a configuration for the ML-based displacement positioning; and receive, from at least one network node based on the configuration, a set of RSs associated with the ML-based displacement positioning.

In certain aspects, the one or more location servers 168 may have an ML-based displacement positioning configuration component 199 that may be configured to transmit, for a UE, a request to report information associated with ML-based displacement positioning; receive, from the UE based on the request, the information associated with the ML-based displacement positioning; transmit, for the UE based on the information, a configuration for the ML-based displacement positioning; and receive, from the UE based on the configuration, a set of displacement RFFP measurements or an estimated displacement of the UE.

Figures 2A, 2B, 2C, 2D:
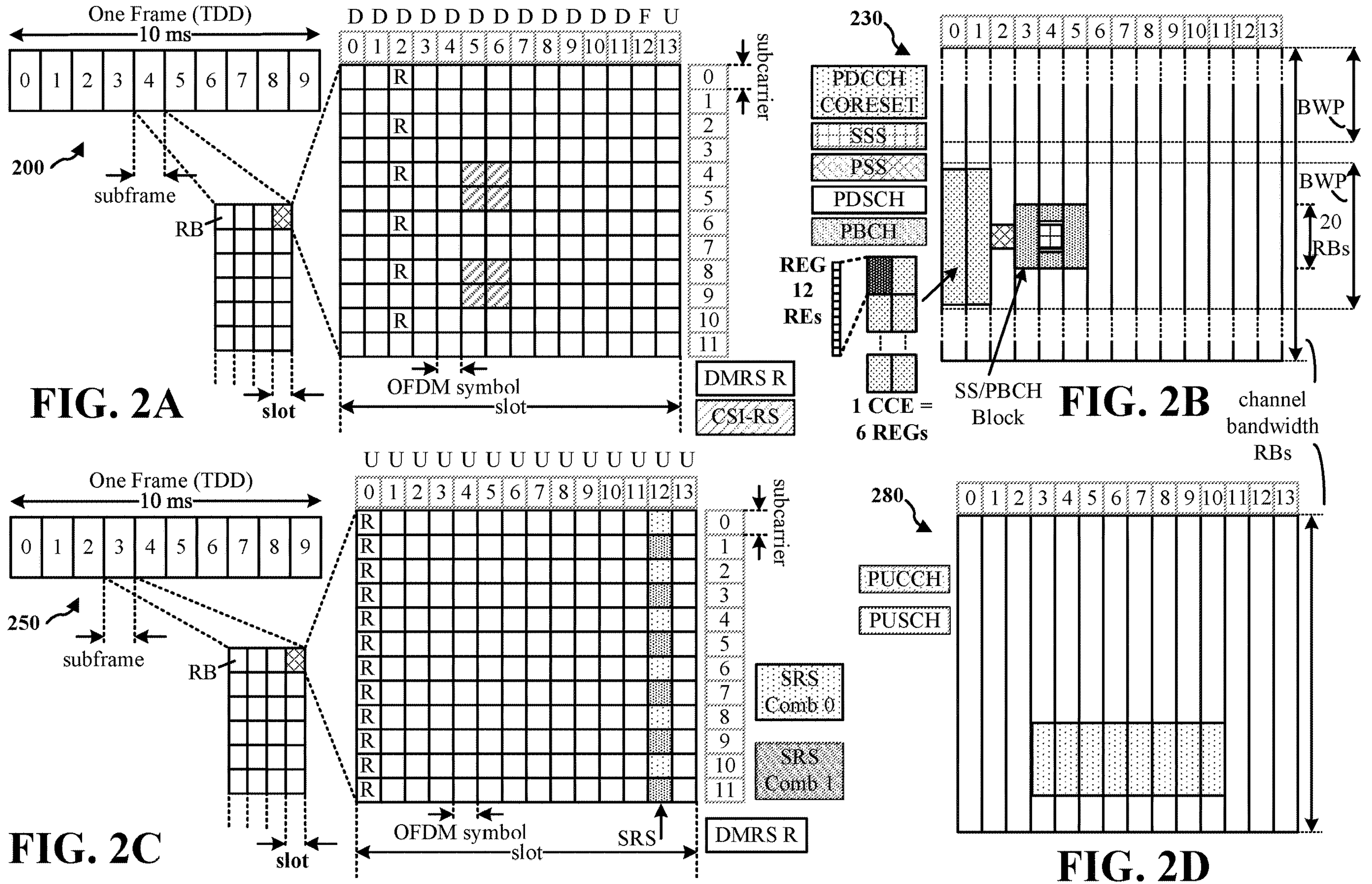
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology p=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
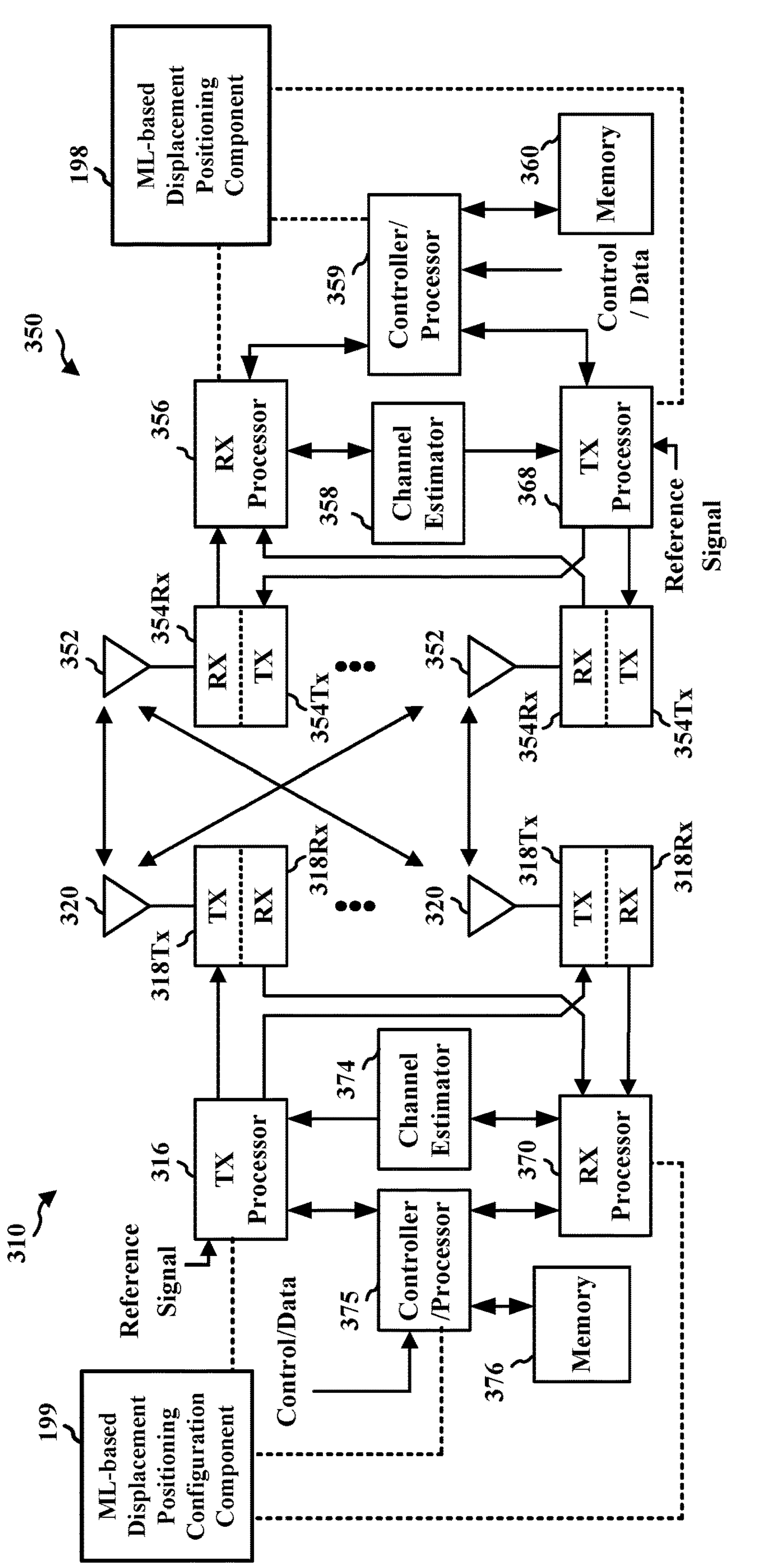
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the ML-based displacement positioning component 198 of FIG. 1.

At least one of the TX processor 316, the RX processor 370, and the controller/processor 375 may be configured to perform aspects in connection with the ML-based displacement positioning configuration component 199 of FIG. 1.

Figure 4:
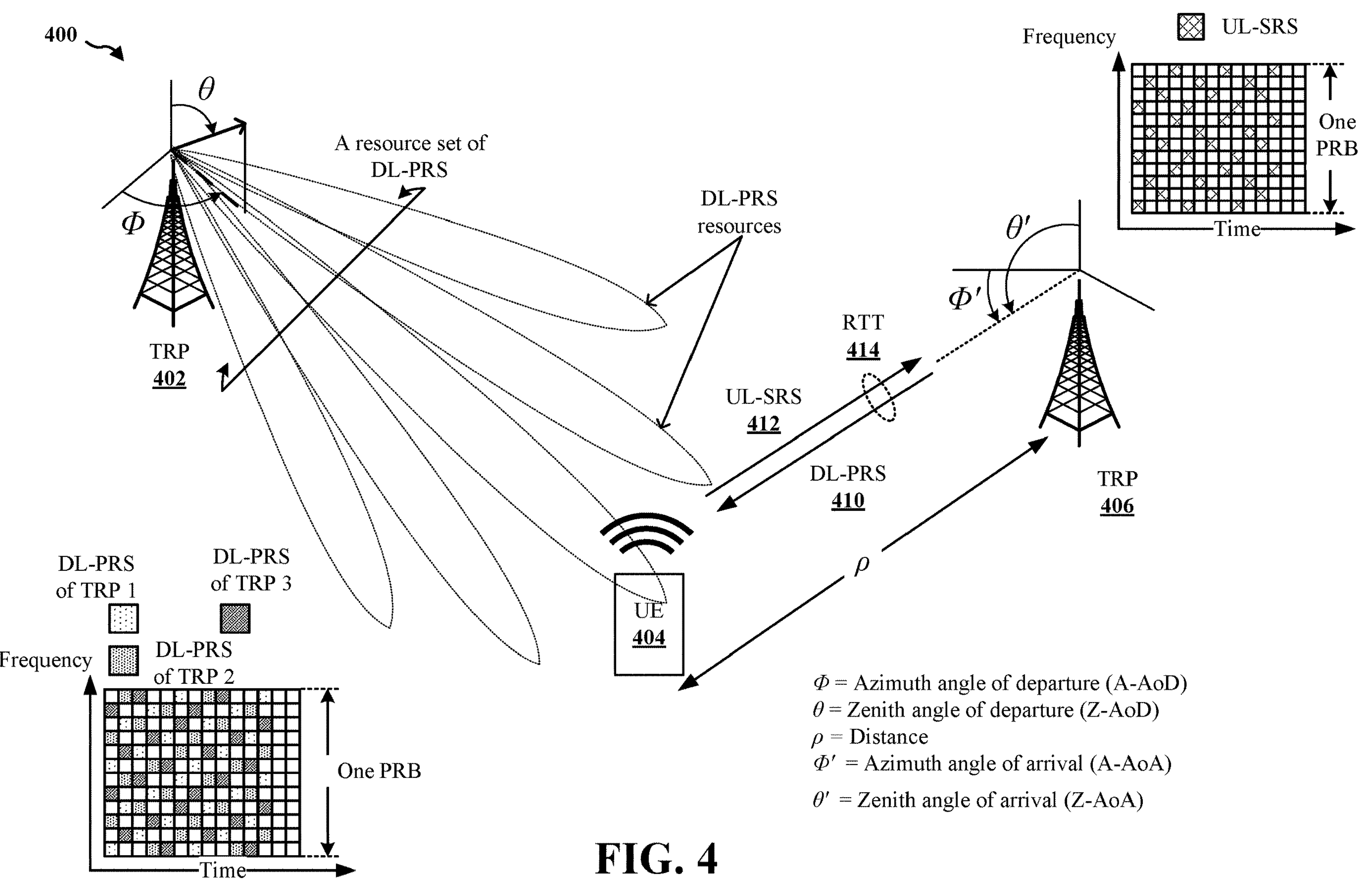
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some scenarios, in additional to GNSS-based positioning (e.g., performing positioning based on measuring GNSS signals from GNSS satellites) and/or network-based positioning (e.g., as described in connection with FIG. 4), a UE may also estimate or calculate its position or relative position (e.g., between two points in time) by measuring its displacement. For example, a UE may be able to generate and record its displacement using one or more sensors, such as inertial measurement units (IMUs). An inertial measurement unit (IMU) is a device/apparatus that is capable of measuring and reporting a specific gravity and/or angular rate of an object to which it is attached (e.g., the UE). In some examples, an IMU may include a gyroscope (e.g., for measuring angular rate), an accelerometer (e.g., for measuring force/acceleration), and/or a magnetometer (e.g., for measuring magnetic field), etc. The accelerometer (e.g., a three-axis accelerometer) may be used for measuring the moving speed of the electronic device in a linear direction. In some examples, an accelerometer may include abilities to detect gravity as a static acceleration and detect dynamic acceleration applied to the electronic device. The gyroscope (e.g., a three-axis gyroscope) may be used for determining the angular motion of the electronic device. For example, the gyroscope may determine whether the electronic device is twisted in any direction by measuring angular velocity and/or rotational force around three axes (e.g., X-axis, Y-axis, and Z-axis) of the gyroscope. The magnetometer (which may also be referred to as a compass) may be used for sensing magnetic fields, such as detecting a compass moving in a direction relative to the Earth's magnetic north pole. In some examples, the magnetometer may further be used for assisting the calibration of the gyroscope, such as used for determining gyroscope or gyroscopic biases for calibrating the gyroscope. As such, the displacement and/or an absolute orientation of the electronic device may be detected by a combination of the accelerometer, the gyroscope, and the magnetometer, which may also be used for a navigation system of the electronic device.

In some examples, a series of displacements may be referred to as a dead reckoning (DR) trajectory. Under navigation or position tracking, DR may refer to a process of calculating a current position of a moving object (e.g., a user holding/wearing the electronic device that is performing the DR trajectory) based on the speed, heading direction, and/or course of the moving object over a period of time from an initial position (e.g., a previously determined position or fix).

Figure 5:
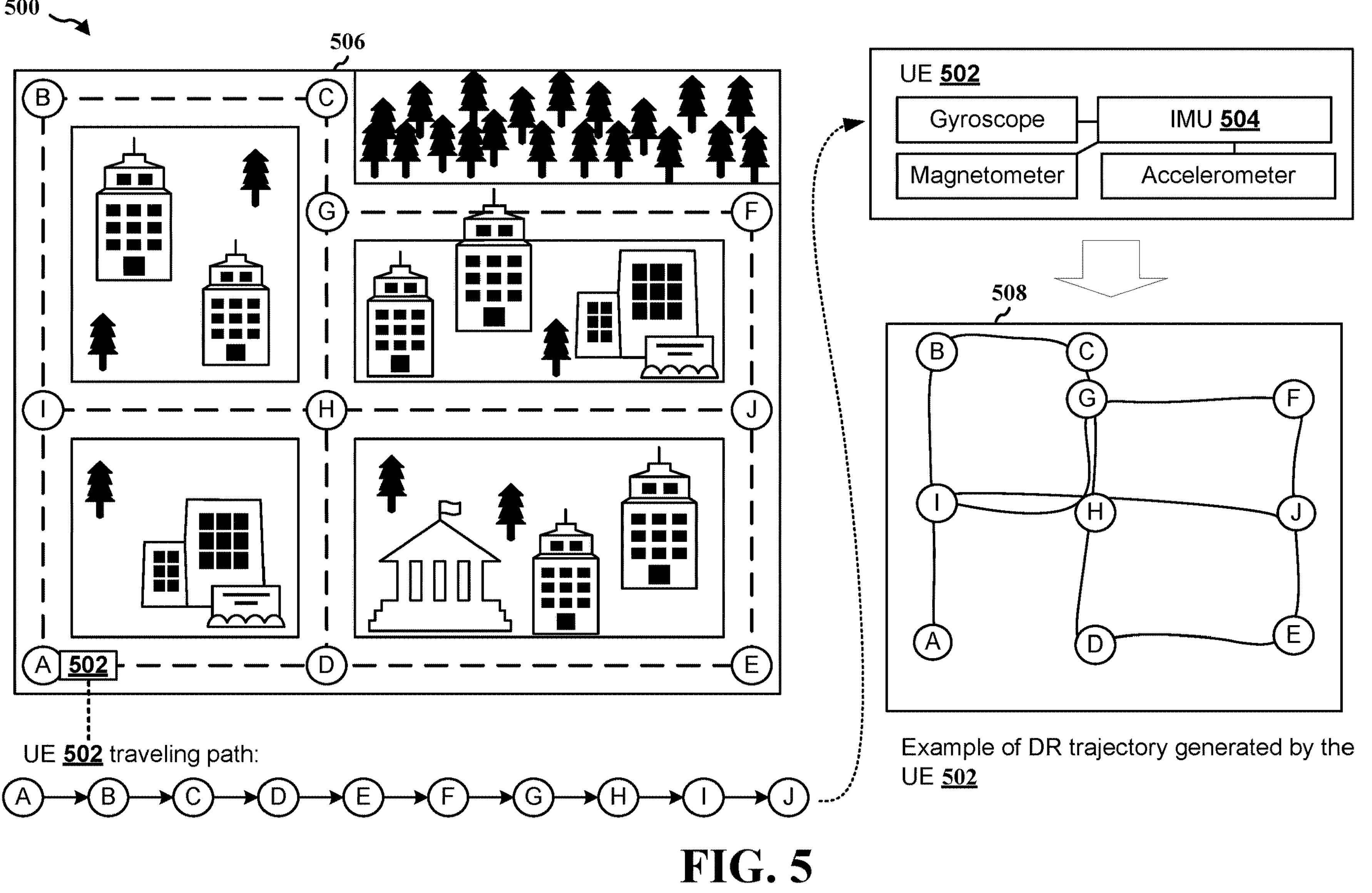
FIG. 5 is a diagram illustrating an example of a UE estimating/calculating its dead reckoning (DR) trajectory using an inertial measurement unit (IMU) in accordance with various aspects of the present disclosure.

FIG. 5 is a diagram 500 illustrating an example of a UE estimating/calculating its DR trajectory using an IMU in accordance with various aspects of the present disclosure. A UE 502 with at least one IMU 504 (which may include an accelerometer, a gyroscope, and/or a magnetometer) may have the capability to generate a DR trajectory when the UE 502 is moving. In one example, the UE 502 may be a smartphone or a wearable device that has a capability to track a user's (e.g., a pedestrian) traveling path, and/or the UE 502 may be a GNSS/tracking device installed on an automobile that has a capability to track the automobile's traveling path, etc. Then, based on the speed, heading direction, and/or course of the UE 502 over a period of time from an initial position, the UE 502 may be able to generate a DR trajectory of the UE 502.

For example, as shown at 506, the UE 502 may be moving alphabetically from Point A to Point J. While the UE 502 is moving, the UE 502 may use the accelerometer of the IMU 504 to measure the moving speed of the UE 502, use the gyroscope of the IMU 504 to detect the angular motion of the UE 502, such as detecting turns at Points B, C, D, E, etc., and use magnetometer of the IMU 504 to track its heading direction. Then, as shown at 508, based on the data collected from the IMU 504, the UE 502 (or the processor of the UE 502) may generate a DR trajectory of the UE 502 from Point A to Point J.

While displacement of a UE may be measured using sensors (e.g., using IMUs), certain UEs (e.g., reduced capabilities (RedCap) UEs) may have no sensors and/or may have noisy sensor outputs (e.g., the sensor does not provide accurate output), which may cause these UEs unable to measure/estimate their displacements. In addition, most networks may not support reporting measurements for conducting artificial intelligence (AI) and/or machine learning (ML) displacement learning with UE assistance.

Aspects presented herein may enable a UE to estimate its displacement(s) based on measuring wireless signals (which may be referred to as displacement positioning), such that UEs without sensors (e.g., IMUs) may also be able to perform displacement estimation accurately (e.g., with certain specified accuracies). Aspects presented herein also provide signaling and reporting between a UE and a network entity (e.g., a base station, a location server, an LMF, etc.) which enables AI/ML-based displacement positioning at a UE side or at a network side (e.g., for UE-assisted positioning). Thus, aspects presented herein may apply to both UE-assisted/LMF-based AI/ML displacement positioning and UE-based AI/ML displacement positioning.

By enabling the displacement of a UE to be measured based on wireless signals, the UE may not be specified to report measurements for two separate positioning occasions or compute two separate positionings (e.g., one at initial position and another one at the displaced position), which may reduce signaling overhead between the UE and the network entity (e.g., the location server, the LMF, etc.). Aspects presented herein may also enable training data to be generated for an AI/ML model that may be used for performing the displacement positioning. In addition, the generation of the training data may also be applied to other types of AI/ML positioning methods, which may bootstrap different positioning label types (e.g., displacement and anchors). For example, an enhanced AI/ML estimated displacement may be leveraged to train other AI/ML positioning methods. Aspects presented herein may also enable a UE (or its sensor(s)) to provide an enhanced sensor output by fusing radio frequency fingerprint positioning (RFFP) estimated displacements with sensor output(s).

For purposes of the present disclosure, AI/ML-based displacement positioning may refer to displacement positioning performed using at least an AI/ML model. For example, the AI/ML model may be configured to estimate the displacement of a UE. A configuration for the AI/ML-based displacement positioning may include one or more parameters associated with the displacement positioning and/or for running the AI/ML model for the AI/ML-based displacement positioning.

Figure 6:
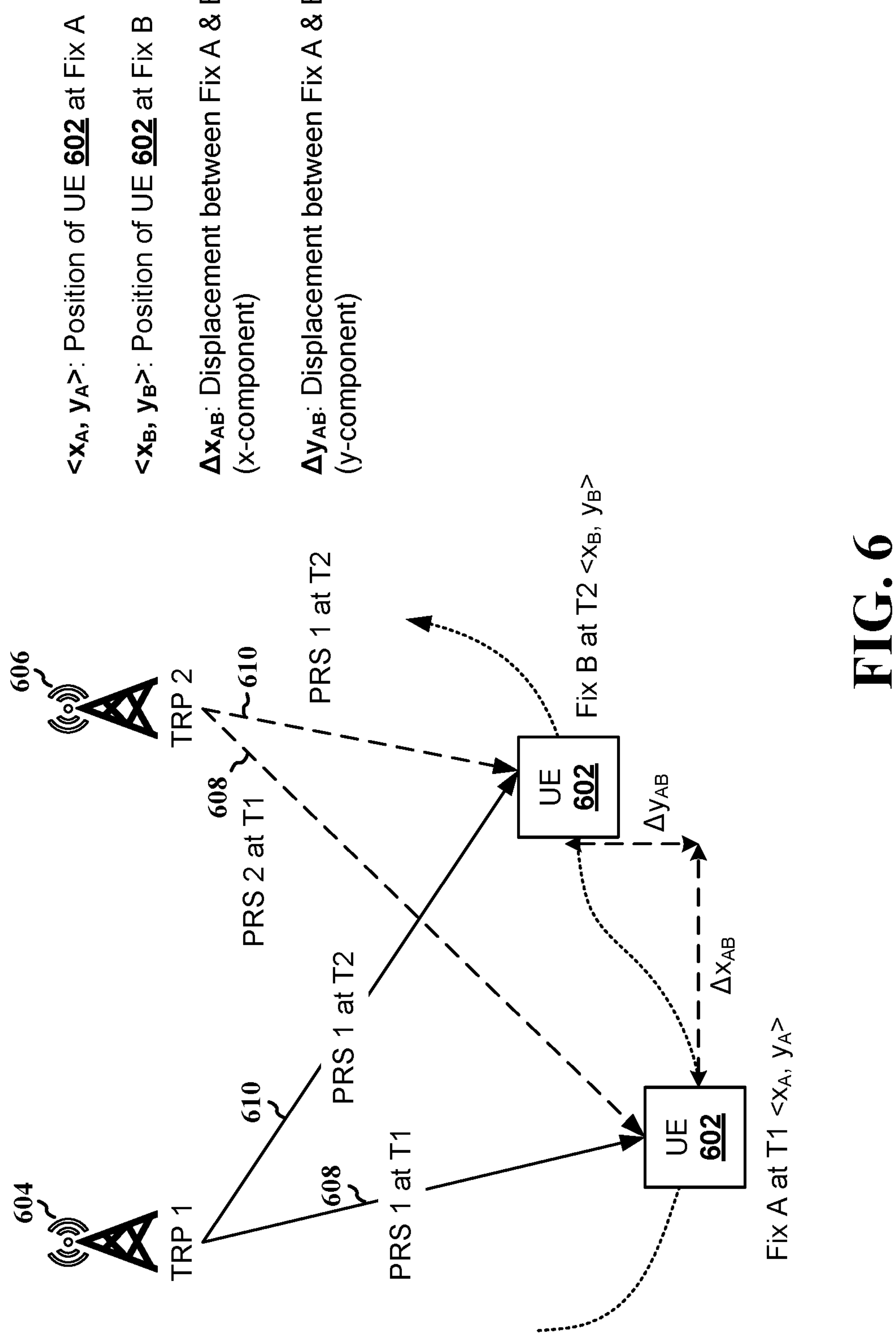
FIG. 6 is a diagram illustrating an example of displacement positioning in accordance with various aspects of the present disclosure.

FIG. 6 is a diagram 600 illustrating an example of displacement positioning in accordance with various aspects of the present disclosure. For purposes of the present disclosure, displacement positioning may refer to determining/estimating the displacement of a UE (e.g., the difference in locations of the UE) at two points in time (or at multiple points in time). For example, as shown at 608, when a UE 602 is at a first position (e.g., at Fix A $\langle x_A, y_A \rangle$) at a first point in time (T1), the UE 602 may receive and measure a positioning reference signal (PRS) (e.g., PRS 1 at T1) transmitted from a first TRP 604 (TRP 1) and a PRS (e.g., PRS 2 at T1) transmitted from a second TRP 606 (TRP 2). Then, as shown at 610, when the UE 602 is at a second position (e.g., at Fix B $\langle x_B, y_B \rangle$) at a second point in time (T2), the UE 602 may receive and measure another PRS (e.g., PRS 1 at T2) transmitted from the first TRP 604 and another PRS (e.g., PRS 2 at T2) transmitted from the second TRP 606. In some examples, the measurement of PRSs transmitted from the first TRP 604 and the second TRP 606 may be refer to as radio frequency (RF) fingerprint. In one aspect of the present disclosure, the displacement of the UE 602 may be estimated based on the aggregation/composition or difference in measurements of PRSs transmitted from the first TRP 604 and the second TRP 606 at the first point in time and at the second point in time, which may be referred to as "displacement measurement" and/or "displacement RFFP measurement" (discussed in details below). For purposes of the present disclosure, the term "aggregation" may be used interchangeably with the term "composition." Thus, the displacement of the UE 602 may include $\Delta x_{AB}$, which may refer to the displacement of the UE 602 between the first position and the second position in x-axis, and $\Delta y_{AB}$, which may refer to the displacement of the UE 602 between the first position and the second position in y-axis. While the example in FIG. 6 shows the displacement of the UE 602 based on a two-dimensional (2D) scenario (e.g., on x-axis and y-axis), the displacement may also apply to a three-dimensional (3D) scenario, which may include an additional z-axis. Thus, the displacement of the UE 602 may further include $\Delta z_{AB}$, which may refer to the displacement of the UE 602 between the first position and the second position in z-axis.

FIG. 7A is a diagram 700A illustrating an example of UE-assisted/network-based ML displacement positioning in accordance with various aspects of the present disclosure. For purposes of the present disclosure, UE-assisted or network-based (e.g., LMF-based) ML displacement positioning may refer to a UE performing positioning related measurements (e.g., measuring positioning reference signals) and transmitting the positioning related measurements to a network entity (e.g., a location server, an LMF, etc.). Then, the network entity may estimate the position of the UE (e.g., an absolute position of the UE, a relative position of the UE, a displacement position of the UE, a ground truth location of the UE, etc.) based on the positioning related measurements using an ML/AI model. For example, a UE 702 may receive and measure PRSs transmitted from a base station 704 (e.g., via a first TRP and a second TRP as discussed in connection with FIG. 6), and the UE 702 may transmit the PRS measurements to a location server 706 (e.g., an LMF). Based on the PRS measurements, an AI/ML model 708 associated with the location server 706 may be configured to determine the displacement of the UE 702, such as based on radio frequency fingerprint positioning (RFFP) (discussed in details below).

FIG. 7B is a diagram 700B illustrating an example of UE-based ML displacement positioning in accordance with various aspects of the present disclosure. On the other hand, UE-based ML displacement positioning may refer to a UE performing positioning related measurements and estimating its position based on the positioning related measurements. For example, the UE 702 may receive and measure PRSs transmitted from a base station 704 (e.g., via a first TRP and a second TRP as discussed in connection with FIG. 6), and the UE 702 may determine its displacement based on the PRS measurements, such as based on RFFP using an AI/ML model 708 (discussed in details below). In some examples, the UE 702 may also transmit its displacement information to the location server 706. In some examples, for UE-based positioning, a UE may also receive positioning related measurements from other network entities, such as from a base station/TRP and/or a location server, etc.

In some scenarios, as described in connection with FIGS. 6, 7A, and 7B, the position of a UE may be determined based on radio frequency (RF) fingerprints. For example, RF (e.g., wireless signals) transmitted from a wireless device (e.g., a UE, a TRP, a wireless access point (AP), etc.) or from a group of wireless devices may contain one or more features/patterns that are different from another wireless device or another group of wireless devices. In other words, RF transmitted from a wireless device or from a group of wireless devices may be unique, and the unique feature/pattern associated with this RF may be referred to as an RF fingerprint. For purposes of the present disclosure, technology that is associated with RF fingerprint may be referred to as "RF fingerprinting" and/or "RFFP," and positioning methods associated with RF fingerprinting may be referred to as "RF fingerprinting-based positioning," "RFFP-based positioning," and/or "RFFP positioning." RF fingerprinting aims to develop a unique RF fingerprint for a wireless device that may be used as an identity, which may be similar to how a biological fingerprint operates. For example, an RF fingerprint may include radio measurements from multiple APs/TRPs, e.g., received signal strengths (RSS), path-loss, and/or channel impulse response measurements, etc., to provide a fingerprint of radio conditions at a specific location (e.g., at Fix A and Fix B in FIG. 6). Then, the location of a fingerprint may be estimated using the known location of similar fingerprints previously recorded. For example, RF fingerprints from different locations may be captured and recorded in a database. Thus, if an RF fingerprint captured by a wireless device matches an RF fingerprint stored in the database, the location of the wireless device may be estimated.

In some examples, the RF fingerprint database may be created and/or maintained based on ML, and RFFP positioning with ML may be referred to as ML RFFP positioning. For ML RFFP positioning, RF fingerprints and their associated positions may be used as features and labels, respectively, to train an ML module (e.g., the AI/ML model 708) in a supervised manner. After the ML module is trained, the ML module may be used to estimate positions by passing it with newly captured RF fingerprints. In other words, an ML module may be configured to collect RF fingerprints and their associated locations, and this process may be referred to as ML position training or simply ML training. After the ML module is trained (e.g., RF fingerprints stored in the database are associated with known locations with certain level of certainties/accuracies), the ML module may be used for estimating the location of a detected/captured RF fingerprint, and this process may be referred to as ML position inference or simply ML inference. In some examples, ML position training/inference may be applied on UE side and/or on the network side. The RFFP ML training and inference may also be based on millimeter wave (mmW or mmwave), sub-THz, and/or THz frequencies.

Figure 8:
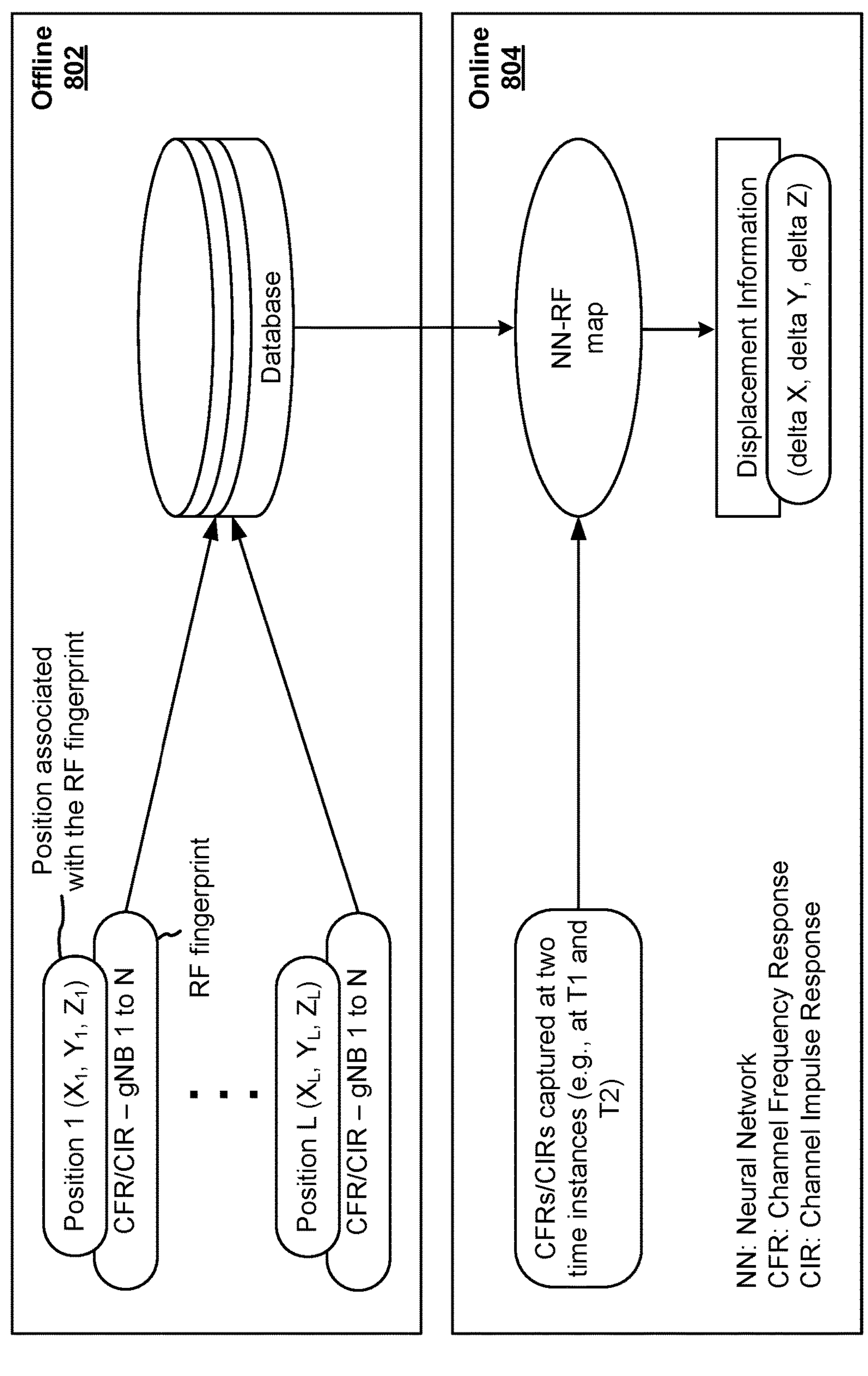
FIG. 8 is a diagram illustrating an example of artificial intelligence (AI)/ML position training and inference for estimating displacement of a UE based on radio frequency fingerprint positioning (RFFP) in accordance with various aspects of the present disclosure.

FIG. 8 is a diagram 800 illustrating an example of AI/ML position training and inference for estimating displacement of a UE based on RFFP in accordance with various aspects of the present disclosure. During an offline stage 802 (which may also be referred to as a training stage), a database may be configured to collect RF fingerprints, such as channel frequency responses (CFRs) and/or channel impulse responses (CIRs), and their associated locations (e.g., locations in which the CFRs/CIRs are captured). As such, each RF fingerprint in the database may be associated to a known location, such as corresponding to a local coordinate (x, y) or (x, y, z), a global coordinate (e.g., latitude and longitude coordinates), a ground truth location, an address, and/or a label, etc. The collection of RF fingerprints may be based on site surveying, crowdsourcing, or by other means. After the RF fingerprints and their associated locations are collected, the database may process them and create a mapping between the RF fingerprints and their associated locations. The mapping may be accessed by a neural network (NN) or an AI/ML module associated with the NN. This training process may be performed at a UE, at a network entity (e.g., a location server, an LMF, etc.), or at a third-party entity.

At an online stage 804 (which may also be referred to as an operational stage or a training stage), the NN or the AI/ML module may receive RF fingerprint captured by a wireless device that has an unknown location. The NN may compare the RF fingerprint with the unknown location to the mapping, select one or more RF fingerprints from the mapping that are similar to the RF fingerprint with the unknown location, and compute an estimated position for the wireless device. Throughout the process, the NN or the AI/ML module may continue to update the mapping to increase the accuracy of the position estimation.

As the location of a UE may be determined based on RFFP, the displacement of a UE may also be estimated based on the RF fingerprint captured by the UE at its current location, and/or based on the aggregation or difference between the RF fingerprint captured at a first location (e.g., at Fix A) and the RF fingerprint captured at a second location (e.g., at Fix B) (e.g., based on the displacement RFFP measurement). For example, as shown by the diagram 800, at the online stage 804, the NN or the AI/ML module may receive RF fingerprints (e.g., CFRs/CIRs) captured by a wireless device at two time instances (e.g., at T1 and T2). The NN may compare the RF fingerprints captured at the two time instances to the mapping, select one or more RF fingerprints from the mapping that are similar to the RF fingerprints captured at the two time instances, determine the locations of the wireless device at these two time instances, and compute an estimated displacement information for the wireless device for these two time instances (e.g., the displacement (delta (Δ)X, ΔY, ΔZ) of the wireless device between T1 and T2). Throughout the process, the NN or the AI/ML module may continue to update the mapping to increase the accuracy of the displacement estimation.

In one example, labels for training the AI/ML model may be obtained based on at least one of the following options: (1) a mobile reference positioning unit that is equipped with highly accurate sensors that provides displacement information; (2) a mobile reference positioning unit that can be configured to visit known fix locations, where displacement labels may be derived based on these known locations; (3) a set of fixed reference positioning units with known fix locations, where displacement labels may be derived based on these known locations; and/or (4) running other positioning method(s) (e.g., GNSS-based positioning, network-based positioning, etc.) to estimate positions at different fixes and derive displacement information based on these estimates.

Figure 9:
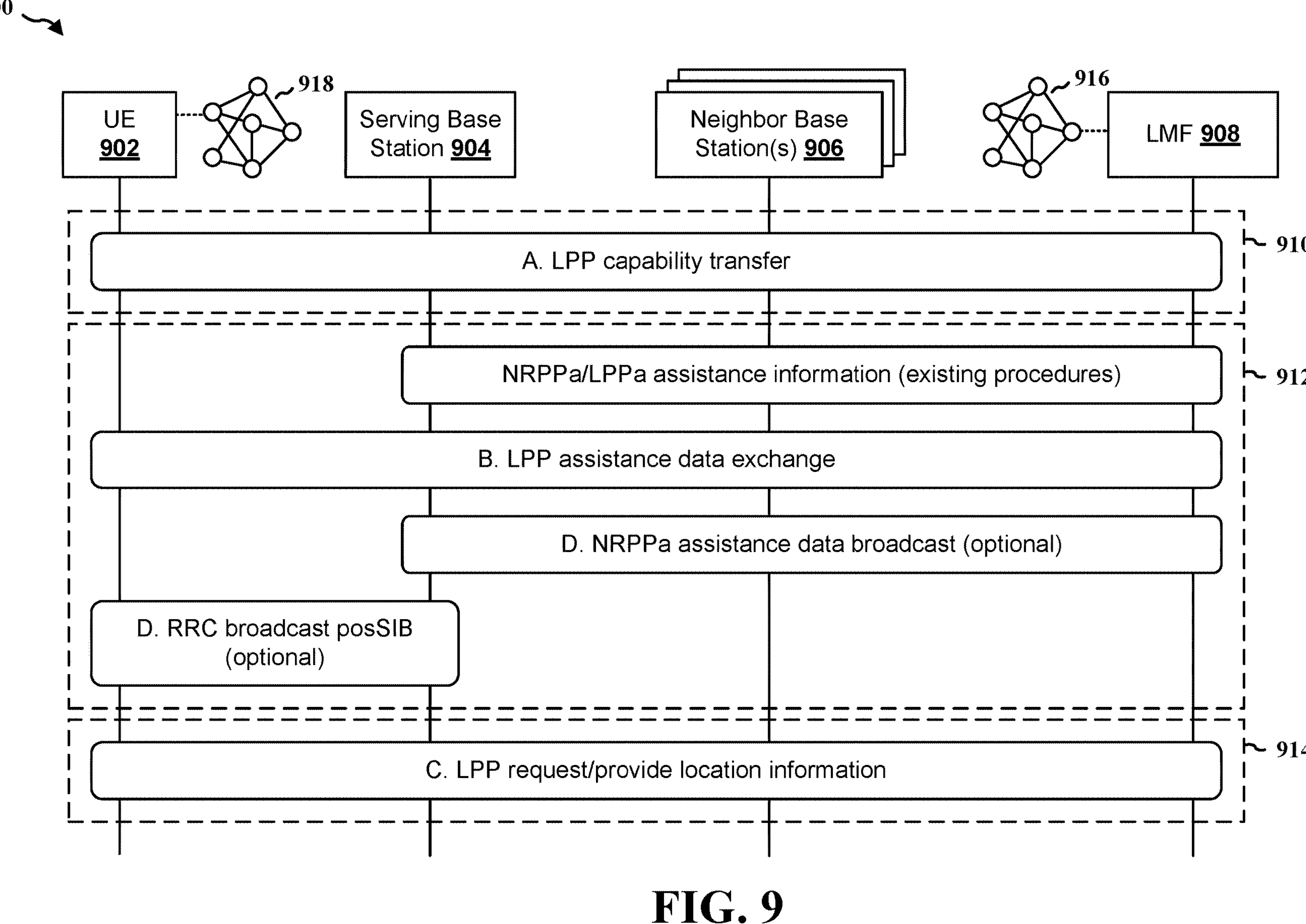
FIG. 9 is a communication flow illustrating an example of signaling and reporting for AI/ML-based displacement positioning in accordance with various aspects of the present disclosure.

FIG. 9 is a communication flow 900 illustrating an example of signaling and reporting for AI/ML-based displacement positioning in accordance with various aspects of the present disclosure. The numberings associated with the communication flow 900 do not specify a particular temporal order and are merely used as references for the communication flow 900. In one example, a UE 902 may be configured by an LMF 908 (or a location server) to perform AI/ML-based displacement positioning, which may include receiving PRSs from a serving base station 904 and/or one or more neighbor base station(s) 906.

In one aspect, the LMF 908 and the UE 902 may exchange signaling to infer target (e.g., the UE 902) displacement information using an AI/ML approach/module, e.g., as part of LTE Positioning Protocol (LPP) Annex (LPPa) signaling. For example, at 910, the LMF 908 may request the UE 902 to indicate its capability to support or perform AI/ML-based displacement positioning, and/or its capability to report intermediate information (e.g., reference signal measurements, RF fingerprint(s) captured, etc.) that may be used for performing the AI/ML-based displacement positioning at the LMF 908.

In one example, the LMF 908 may transmit the request to the UE 902 using a request capabilities message (RequestCapabilities) that is associated with an LPP capability transfer procedure. For example, during an LPP capability transfer procedure, the LMF 908 may request the UE 902 to report its capability regarding the two modes for the ML displacement positioning (e.g., as part of LPPa signaling). The first mode (mode 1) may be associated with the UE-assisted/LMF-based displacement positioning, where the UE 902 may be configured to report PRS-based intermediate quantities (e.g., displacement RFFPs) that can be used for performing the AI/ML-based displacement positioning at the LMF 908. In one example, the PRS-based intermediate quantities may correspond to aggregation of PRS measurements from multiple base stations/TRPs. For example, referring back to FIGS. 7A, the PRS-based intermediate quantities may be an aggregated measurement of the PRSs (e.g., PRS 1 and PRS 2) transmitted from the first TRP and the second TRP of the base station 704. The displacement RFFP measurements (or the displacement RFFPs) may refer to the aggregation (or difference) of PRSs measurements (e.g., PRS 1 and PRS 2) captured at two different locations (e.g., at two fixes). The second mode (mode 2) may be associated with the UE-based displacement positioning, where the UE 902 may conduct PRS-based ML displacement positioning and report the displacement result (e.g., the displacement information of the UE 902) back to the LMF 908.

In one example, the displacement result/information may correspond to at least one of the following options: (1) a radial distance (e.g., $\Delta r$) between a first location (e.g., a first fix, Fix A) and a second location (e.g., a second fix, Fix B); (2) angular information (e.g., elevation $\Delta\theta$, azimuth $\Delta\phi$) between the first location and the second location with respect to a known reference location; (3) radial and angular information (e.g., $\Delta r, \Delta\theta, \Delta\phi$) between the first location and the second location; (4) a distance (e.g., $\Delta x$, $\Delta y$, $\Delta z$) between the first location and the second location (e.g., as described in connection with FIG. 6); and/or (5) a difference in latitudes as well as longitudes (e.g., $\Delta$lat, $\Delta$long) the first location and the second location.

Based on the request, the UE 902 may respond to the LMF 908 with a UE capability messaging that indicates the UE 902's capability to support or perform AI/ML-based displacement positioning, and/or the UE 902's capability to report intermediate information that may be used for performing the AI/ML-based displacement positioning at the LMF 908 (collectively as capability to perform/assist ML-based displacement positioning). The UE 902 may transmit the response (e.g., the UE capability) to the LMF 908 using a provide capabilities message (ProvideCapabilities) that is also associated with the LPP capability transfer procedure. For example, the capability message may include whether the UE 902 supports one of the two modes (e.g., the mode 1 and the mode 2 described above) for the ML displacement positioning. The capability message may also include the bandwidth capability of the UE 902, the buffering capabilities of the UE 902 related to observing multiple PRS resources (e.g., the ability of the UE 902 to measure PRSs from multiple base station/TRPs at the same time, which may be used by the LMF for configuring a time gap for the UE 902), supported displacement RFFP types in which the UE 902 is capable of constructing/performing and/or reporting (e.g., to the LMF 908), measurement gap specification (e.g., time to measure PRSs at a first location (Fix A) and at a second location (Fix B), or a combination thereof.

At 912, based on the response from the UE 902, the LMF 908 may configure the UE 902 with the UE-assisted ML displacement positioning or the UE-based ML displacement positioning. For example, the LMF 908 may provide configurations/parameters associated with the AI/ML-based displacement positioning and/or UE-assisted ML displacement positioning to the UE 902 via assistance data (AD) during an LPP AD transfer/exchange procedure (e.g., via a provide assistance data (ProvideAssistanceData) message). The configuration may also include parameters associated with the AI/ML model used for the AI/ML-based displacement positioning.

In one example, the configuration messaging (e.g., the assistance data) may include a time granularity of PRS resources the UE 902 is specified to consider for obtaining displacement information or for reporting displacement RFFP measurements (e.g., how often the UE 902 is specified to measure the PRSs, such as every 50 ms, every 10 seconds, every minute, etc.). In another example, the configuration messaging may include a periodicity in which the UE 902 is specified to report its displacement information or the displacement RFFP measurements. In another example, the configuration messaging may include the possibility/ability for the UE 902 to adapt the time granularity of PRS resources for obtaining displacement information or for reporting displacement RFFP measurements based on an estimated speed of the UE 902 (e.g., if the UE 902 is moving at a speed above a speed threshold, the UE 902 may not be able to adapt the time granularity of PRS resources). For example, the UE 902 may estimate its speed and skip some PRS resources for obtaining displacement information or for reporting displacement RFFP measurements. In another example, the UE 902 may be configured to measure PRS resources more often if the UE 902 is moving at a higher speed, and/or the UE 902 may be configured to measure PRS resources less often if the UE 902 is moving at a lower speed, etc.

At 914, for the UE-assisted ML displacement positioning, as described in connection with FIG. 7B, the UE 902 may observe, receive, and measure PRSs (or other types of reference signals) transmitted from over two (or multiple) time resources (e.g., from the serving base station 904 and/or the one or more neighbor base station(s) 906). Then, the UE 902 may derive displacement RFFP measurements based on the PRSs (e.g., the aggregation/difference in RFFP measurements between the two (or multiple) time resources), and report the derived displacement RFFP measurements to the LMF 908. In one example, the UE 902 may report the derived displacement RFFP measurements to the LMF 908 based on an LPP request/provide location information procedure, such as via a provide location information (ProvideLocationInformation) message. In response, the LMF 908 may leverage the reported displacement RFFP measurements to infer the displacement information of the UE 902, such as using an AI/ML module 916 at the LMF side that is trained/configured to infer the displacement of a UE based on displacement RFFP measurements (e.g., as described in connection with FIG. 8). In some examples, the UE 902 may also be configured to report other displacement information obtained using non-radio access technology (non-RAT) method(s) (e.g., using IMUs as described in connection with FIG. 5, motion sensors, etc.) if available along with the displacement RFFP measurements. In some examples, the displacement RFFP measurements may also be referred to as radio access technology (RAT)-based displacement RFFP measurements, where the RFFP measurements are based on measuring reference signals transmitted from one or more base stations/TRPs.

On the other hand, for the UE-based ML displacement positioning, as described in connection with FIG. 7A, the UE 902 may observe, receive, and measure PRSs (or other types of reference signals) transmitted from over two (or multiple) time resources (e.g., from the serving base station 904 and/or the one or more neighbor base station(s) 906). Then, the UE 902 may derive displacement RFFP measurements based on the PRSs (e.g., the aggregation/difference in RFFP measurements between the two (or multiple) time resources), and the UE 902 may conduct inference of the displacement information of the UE 902, such as using an AI/ML module 918 at the UE side that is trained/configured to infer the displacement of a UE based on displacement RFFP measurements (e.g., as described in connection with FIG. 8). In some examples, the UE 902 may also be configured to report its displacement information to the LMF 908, such as based on an LPP request/provide location information procedure via a provide location information (ProvideLocationInformation) message. Similarly, the UE 902 may also be configured to report other displacement information obtained using non-RAT method(s) (e.g., using IMUs as described in connection with FIG. 5, motion sensors, etc.) along with RAT-based displacement information. The RAT-based displacement information may refer to displacement information of the UE 902 obtained based on measuring reference signals transmitted from one or more base stations/TRPs (e.g., RFFP measurements). In one example, the UE 902 may also be configured to fuse other displacement information obtained using non-RAT methods (e.g., IMUs, motion sensors) along with RAT-based displacement information. For example, the fusion may be applied by the UE 902 (or by a positioning engine of the UE 902) in a manner similar to sensor fusion. This may reduce the reporting overhead for the UE 902. In another example, the UE 902 may also be configured to report soft-information of ML RAT-based displacement information. Soft-information may refer to the probability/indication of how accurate the displacement information may be (e.g., a variance, an expectation, and/or a deviation, etc.). For example, the ML module 918 may provide soft-information of its estimated displacements ( $\widetilde{\Delta v_{xAB}}$ , $\widetilde{\Delta v_{yAB}}$ ) in addition to the displacement information.

In one aspect of the present disclosure, for UE-based displacement positioning that is performed with an AI/ML module (e.g., the AI/ML module 918), an AI/ML-based positioning displacement estimation method may be configured to run on the target UE (e.g., the UE 902), where the output of the AI/ML module may be the displacement information of the target UE and the inputs may be radio fingerprints constructed from a first RF measurement and a second RF measurement. The first RF measurement may correspond to a first set of signals transmitted by a first set of TRPs and observed by the target UE while it is on a first fix, and the second RF measurement may correspond to a second set of signals sent by a second set of TRPs and observed by the target UE while it is on a second fix, such as shown by FIG. 6.

On the other hand, for UE-assisted displacement positioning that is performed with an AI/ML module (e.g., the AI/ML module 916), an ML-based positioning displacement estimation method may be configured to run on a location server (e.g., the LMF 908), where the output of the AI/ML module may be the displacement information of a target UE (e.g., the UE 902) and inputs may be displacement radio fingerprints reported by the target UE and constructed from a first RF measurement and a second RF measurement. Similarly, the first RF measurement may correspond to a first set of signals transmitted by a first set of TRPs and observed by the target UE while it is on a first fix, and the second RF measurement may correspond to a second set of signals sent by a second set of TRPs and observed by the target UE while it is on a second fix, such as shown by FIG. 6.

In one example, the first set of signals and the second set of signals may be downlink (DL) reference signals (e.g., positioning reference signals (PRS), channel state information reference signals (CSI-RS), synchronization signal block (SSB), etc.). In another example, the first set of TRPs may be the same as the second set of TRPs, or they may be different or partially different from each other (e.g., with some TRPs overlapping). In some implementations, if the target UE has sensors available (e.g., IMUs, motion sensors, etc.), the target UE may be configured to record sensor information whose timing falls between the timing of the first set of signals and the second set of signals (inclusive), where the recorded sensor information may be leveraged to obtain labels for training the AI/ML module. As described in connection with FIG. 8, the training of the AI/ML module may be performed at the target UE (e.g., the UE 902), the location server (e.g., the LMF 908), and/or at a third-party server (e.g., an over-the-top (OTT) server run by the target UE vendor).

In another example, the displacement RFFPs may be an aggregation/composition of the first RF measurement and the second RF measurements, which may include: a channel impulse response (CIR) measurement, a channel frequency response (CFR) measurement, a reference signal received quality (RSRQ) measurement, a reference signal received power (RSRP) measurement, a delay spread measurement, an angle spread measurement, an angle of arrival (AoA) measurement, an angle of departure (AoD) measurement, a Doppler spread measurement, or a combination thereof. The aggregation/composition of RF measurements may reduce the reporting overhead for the target UE.

Aspects discussed in connection with FIG. 9 provide various signaling and reporting between a UE and a network entity (e.g., an LMF) for displacement positioning. For example, in one aspect, in response to a request from an LMF, a UE may respond with its capability to either conduct (UE-based) or assist (UE-assisted) in ML-based displacement positioning. The LMF may then configure the UE for ML-based displacement positioning. In another aspect, the UE's capability response may also include the UE's bandwidth capability, the UE's buffering capability for multiple PRS resources, the UE's supported displacement RFFP types, and/or the UE's measurement gap specification. In another aspect, the LMF's configuration message for the UE may be sent as part of assistance data signaling and may include: time granularity of PRS resources the UE is supposed to consider, the specified periodicity of reporting RFFP measurements or displacement measurements, a possibility for the UE to adapt the time granularity and the periodicity. In another aspect, for UE-assisted displacement positioning, a UE may observe PRS signals sent over two (or multiple) time resources and derive displacement RFFP measurements and reports them to an LMF. The LMF may leverage the reported displacement RFFP measurements to infer target displacement information. In another aspect, a UE may also report other measurements obtained using non-RAT methods (e.g., motion sensors). In another aspect, a UE may also report soft-information of ML RAT-based displacement information. In another aspect, for UE-based displacement positioning, a UE may observe PRS signals sent over two (or multiple) time resources, derive displacement RFFP measurements, conduct inference of displacement information based on a UE-side ML model, and report displacement information to an LMF. In another aspect, while inferring the displacement information, a UE may also take into account measurements obtained using non-RAT methods (e.g., motion sensors). In another aspect, a UE may also report soft-information of ML RAT-based displacement information. In another aspect, an ML-based positioning displacement estimation method may run on a target UE where an ML model's output is the displacement information of the target UE and the inputs to the ML model are radio fingerprints constructed from a first measurement and a second measurement, in which the first measurement may correspond to a first set of signals sent by a first set of TRPs and observed by the target UE while it is on a first fix, and the second measurement may correspond to a second set of signals sent by a second set of TRPs and observed by the target UE while it is on a second fix. In another aspect, an ML-based positioning displacement estimation method runs on an LMF where an ML model's output is displacement information of a target UE and inputs to the ML model are displacement radio fingerprints reported by target UE and constructed from a first measurement and a second measurement, in which the first measurement may correspond to a first set of signals sent by a first set of TRPs and observed by the target UE while it is on a first fix, and second measurement may correspond to a second set of signals sent by a second set of TRPs and observed by the target UE while it is on a second fix. In another aspect, the first and second signal sets are DL reference signals (e.g., PRS, CSI-RS, SSB, etc.). In another aspect, the first and second set of TRPs are the same. In another aspect, the ML model may be trained using labels generated based on the information from target records sensor whose timing falls between the timing of the first and second signal sets. In another aspect, the ML model may be trained at target UE, LMF or a third party server.

Figure 10:
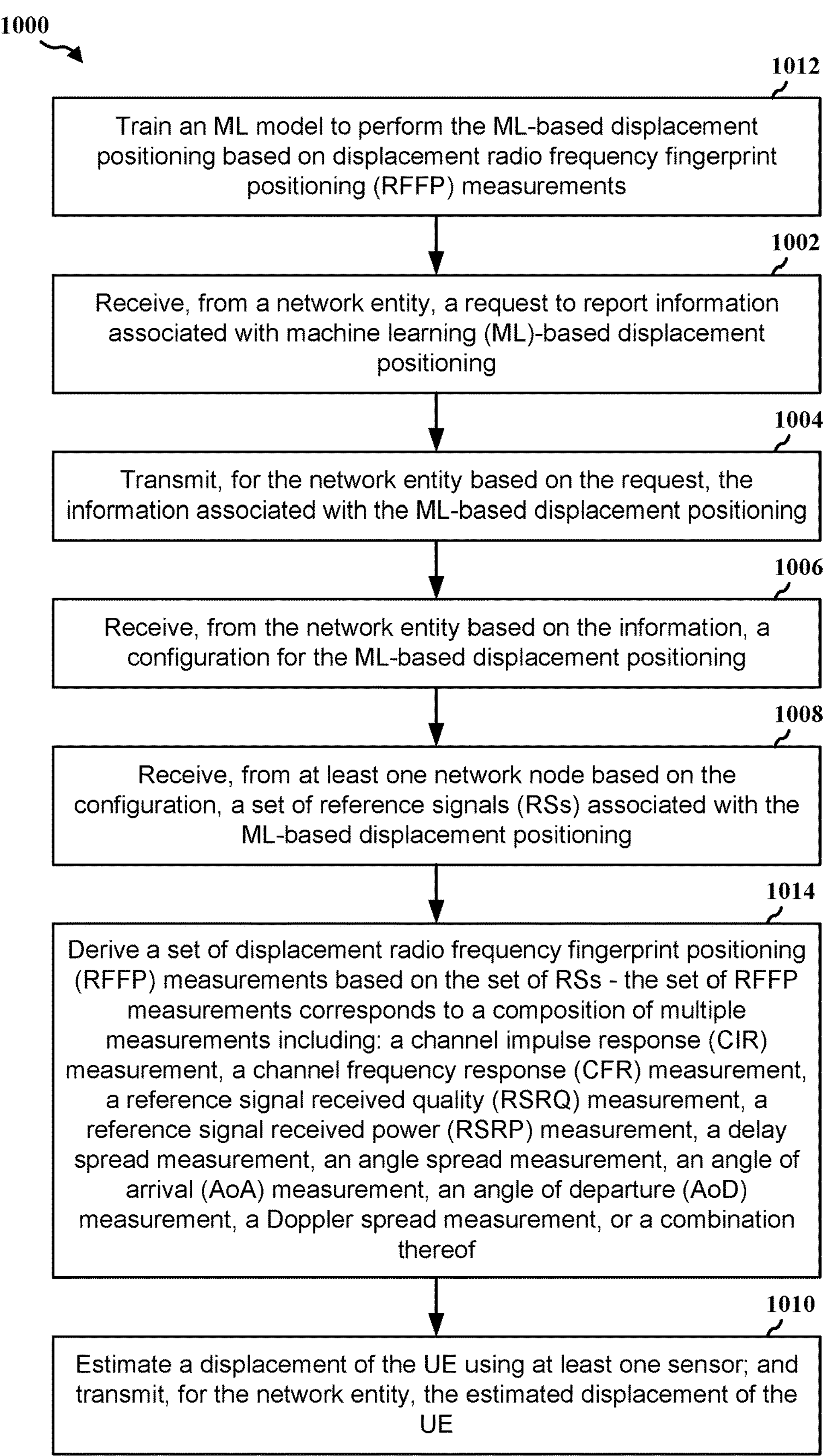
FIG. 10 is a flowchart of a method of wireless communication.

FIG. 10 is a flowchart 1000 of a method of wireless communication. The method may be performed by a UE (e.g., the UE 104, 404, 502, 602, 702, 902; the apparatus 1204). The method may enable the UE or a location server to estimate the displacement of the UE based on measuring wireless signals, such that the UE may perform accurate displacement estimation accurately without using sensors (e.g., IMUs).

At 1002, the UE may receive, from a network entity, a request to report information associated with machine learning (ML)-based displacement positioning, such as described in connection with FIG. 9. For example, at 910, the UE 902 may receive a request from the LMF 908 to indicate the UE 902's capability to support or perform AI/ML-based displacement positioning, and/or the UE 902's capability to report intermediate information (e.g., reference signal measurements, RF fingerprint(s) captured, etc.) that may be used for performing the AI/ML-based displacement positioning at the LMF 908. The reception of the request to report information associated with ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

At 1004, the UE may transmit, for the network entity based on the request, the information associated with the ML-based displacement positioning, such as described in connection with FIG. 9. For example, at 910, based on the request, the UE 902 may respond to the LMF 908 with a UE capability messaging that indicates the UE 902's capability to support or perform AI/ML-based displacement positioning, and/or its capability to report intermediate information that may be used for performing the AI/ML-based displacement positioning at the LMF 908. The transmission of the information associated with the ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

At 1006, the UE may receive, from the network entity based on the information, a configuration for the ML-based displacement positioning, such as described in connection with FIG. 9. For example, at 912, the UE 902 may receive configurations from the LMF 908 for the UE-assisted ML displacement positioning or the UE-based ML displacement positioning. The reception of the configuration for the ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

In one example, the configuration for the ML-based displacement positioning may be received in assistance data. In some implementations, the configuration may include: a time granularity for the set of RSs, a periodicity of reporting a displacement of the UE or a set of displacement RFFP measurements, a capability of the UE to adapt the time granularity for the set of RSs based on a speed of the UE, or a combination thereof.

At 1008, the UE may receive, from at least one network node based on the configuration, a set of reference signals (RSs) associated with the ML-based displacement positioning, such as described in connection with FIG. 9. For example, at 914, the UE 902 may observe, receive, and measure PRSs (or other types of reference signals) transmitted from over two (or multiple) time resources (e.g., from the serving base station 904 and/or the one or more neighbor base station(s) 906). Then, the UE 902 may derive displacement RFFP measurements based on the PRSs (e.g., the difference in RFFP measurements between the two (or multiple) time resources), and report the derived displacement RFFP measurements to the LMF 908. The reception of the set of RSs associated with the ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

In one example, the ML-based displacement positioning may be UE-assisted displacement positioning initiated by the network entity. The UE may derive a set of displacement radio frequency fingerprint positioning (RFFP) measurements based on the set of RSs, and the UE may transmit, for the network entity, the set of displacement RFFP measurements. In some implementations, the information may include a capability of the UE to assist the ML-based displacement positioning and a list of displacement RFFPs that is able to be used for the ML-based displacement positioning at the network entity. In some implementations, a displacement RFFP measurement in the set of displacement RFFP measurements may correspond to a composition of a first measurement of a first reference signal (RS) transmitted from at least one transmission reception point (TRP) when the UE is at a first location, and a second RFFP measurement in the set of displacement RFFP measurements corresponds to a second measurement of a second RS transmitted from the at least one TRP when the UE is at a second location.

In another example, the ML-based displacement positioning may be performed by the UE. The UE may estimate a displacement of the UE based on the set of RSs using an ML model, and the UE may transmit, for the network entity, the estimated displacement of the UE. In some implementations, the information associated with the ML-based displacement positioning may include a capability of the UE to perform the ML-based displacement positioning. In some implementations, the information associated with the ML-based displacement positioning may include: a bandwidth capability of the UE, a buffering capability of the UE to observe multiple reference signal (RS) resources, one or more supported displacement RFFP types the UE is capable of constructing and reporting to the network entity, a measurement gap specification, or a combination thereof. In some implementations, the estimated displacement of the UE may include soft-information of the estimated displacement. In some implementations, to estimate the displacement of the UE based on the set of RSs using the ML model, the UE may transmit, based on the set of RSs, a set of displacement RFFP measurements for the ML model, where a first displacement RFFP measurement in the set of displacement RFFP measurements may correspond to a first measurement of a first reference signal (RS) transmitted from at least one TRP when the UE is at a first location, and a second displacement RFFP measurement in the set of displacement RFFP measurements may correspond to a second measurement of a second RS transmitted from the at least one TRP when the UE is at a second location, and the UE may receive, from the ML model, the displacement of the UE based on the set of displacement RFFP measurements.

In another example, the ML-based displacement positioning may be performed by the UE, and the UE may estimate a first displacement of the UE based on the set of RSs using an ML model, estimate a second displacement of the UE using a sensor, fuse the first displacement and the second displacement to obtain a fused displacement, and then transmit the fused displacement for the network entity.

In another example, the set of RSs may include: one or more positioning reference signals (PRSs), one or more channel state information reference signals (CSI-RSs), one or more synchronization signal blocks (SSBs), or a combination thereof.

In another example, to receive the set of RSs associated with the ML-based displacement positioning based on the configuration, the UE may receive a first subset of RSs in the set of RSs from a first set of TRPs when the UE is at a first location; and the UE may receive a second subset of RSs in the set of RSs from a second set of TRPs when the UE is at a second location. In some implementations, the first set of TRPs and the second set of TRPs include at least one same TRP.

In another example, at 1010, the UE may estimate a displacement of the UE using at least one sensor; and transmit, for the network entity, the estimated displacement of the UE, such as described in connection with FIG. 9. For example, the UE 902 may also be configured to report other displacement information obtained using non-RAT method (s) (e.g., using IMUs as described in connection with FIG. 5, motion sensors, etc.) along with RAT-based displacement information. The estimation of the displacement and/or the transmission of the estimated displacement may be performed by, e.g., the ML-based displacement positioning component 198, the application processor 1206, the cellular baseband processor 1224, one or more sensor modules 1218, and/or the transceiver(s) 1222 of the apparatus 1204 in FIG. 12.

In another example, at 1012, the UE may train an ML model to perform the ML-based displacement positioning based on displacement RFFP measurements, such as described in connection with FIG. 8. For example, a UE may be configured to perform AI/ML position training and inference for RFFP. The training of the ML model may be performed by, e.g., the ML-based displacement positioning component 198, the application processor 1206, the cellular baseband processor 1224, and/or the transceiver(s) 1222 of the apparatus 1204 in FIG. 12. In some implementations, the UE may record second information from at least one sensor during reception of the set of RSs, where the ML model is further trained based on the second information.

In another example, at 1014, the UE may derive a set of displacement radio frequency fingerprint positioning (RFFP) measurements based on the set of RSs, where the set of RFFP measurements corresponds to a composition of multiple measurements including: a CIR measurement, a CFR measurement, an RSRQ measurement, an RSRP measurement, a delay spread measurement, an angle spread measurement, an AoA measurement, an AoD measurement, a Doppler spread measurement, or a combination thereof, such as described in connection with FIG. 9. For example, the displacement RFFPs may be a composition of the first RF measurement and the second RF measurements, which may include: a CIR measurement, a CFR measurement, an RSRQ measurement, an RSRP measurement, a delay spread measurement, an angle spread measurement, an AoA measurement, an AoD measurement, a Doppler spread measurement, or a combination thereof. The derivation of the set of displacement RFFP measurements may be performed by, e.g., the ML-based displacement positioning component 198, the application processor 1206, the cellular baseband processor 1224, and/or the transceiver(s) 1222 of the apparatus 1204 in FIG. 12.

Figure 11:
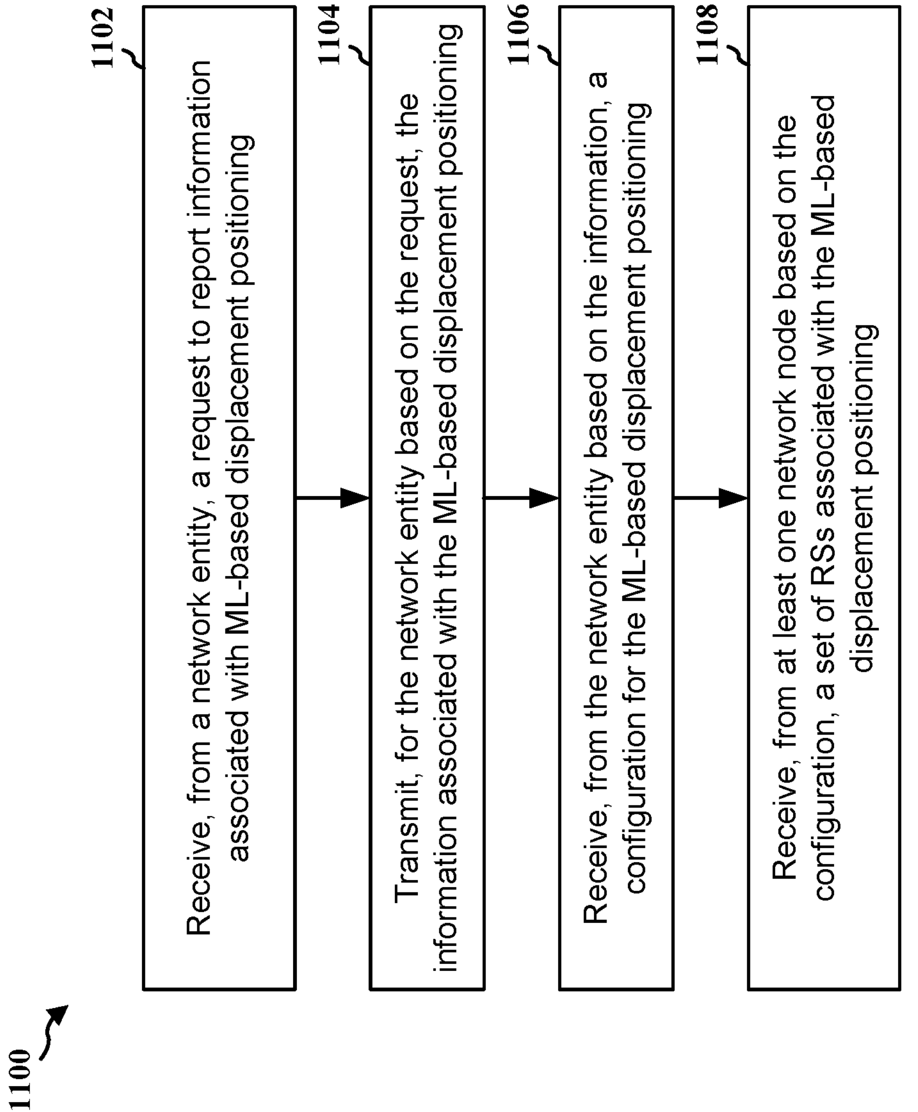
FIG. 11 is a flowchart of a method of wireless communication.

FIG. 11 is a flowchart 1100 of a method of wireless communication. The method may be performed by a UE (e.g., the UE 104, 404, 502, 602, 702, 902; the apparatus 1204). The method may enable the UE or a location server to estimate the displacement of the UE based on measuring wireless signals, such that the UE may perform accurate displacement estimation accurately without using sensors (e.g., IMUs).

At 1102, the UE may receive, from a network entity, a request to report information associated with machine learning (ML)-based displacement positioning, such as described in connection with FIG. 9. For example, at 910, the UE 902 may receive a request from the LMF 908 to indicate the UE 902's capability to support or perform AI/ML-based displacement positioning, and/or the UE 902's capability to report intermediate information (e.g., reference signal measurements, RF fingerprint(s) captured, etc.) that may be used for performing the AI/ML-based displacement positioning at the LMF 908. The reception of the request to report information associated with ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

At 1104, the UE may transmit, for the network entity based on the request, the information associated with the ML-based displacement positioning, such as described in connection with FIG. 9. For example, at 910, based on the request, the UE 902 may respond to the LMF 908 with a UE capability messaging that indicates the UE 902's capability to support or perform AI/ML-based displacement positioning, and/or its capability to report intermediate information that may be used for performing the AI/ML-based displacement positioning at the LMF 908. The transmission of the information associated with the ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

At 1106, the UE may receive, from the network entity based on the information, a configuration for the ML-based displacement positioning, such as described in connection with FIG. 9. For example, at 912, the UE 902 may receive configurations from the LMF 908 for the UE-assisted ML displacement positioning or the UE-based ML displacement positioning. The reception of the configuration for the ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

In one example, the configuration for the ML-based displacement positioning may be received in assistance data. In some implementations, the configuration may include: a time granularity for the set of RSs, a periodicity of reporting a displacement of the UE or a set of displacement radio frequency fingerprint positioning (RFFP) measurements, a capability of the UE to adapt the time granularity for the set of RSs based on a speed of the UE, or a combination thereof.

At 1108, the UE may receive, from at least one network node based on the configuration, a set of reference signals (RSs) associated with the ML-based displacement positioning, such as described in connection with FIG. 9. For example, at 914, the UE 902 may observe, receive, and measure PRSs (or other types of reference signals) transmitted from over two (or multiple) time resources (e.g., from the serving base station 904 and/or the one or more neighbor base station(s) 906). Then, the UE 902 may derive displacement RFFP measurements based on the PRSs (e.g., the difference in RFFP measurements between the two (or multiple) time resources), and report the derived displacement RFFP measurements to the LMF 908. The reception of the set of RSs associated with the ML-based displacement positioning may be performed by, e.g., the ML-based displacement positioning component 198, the application processor 1206, the cellular baseband processor 1224, and/or the transceiver(s) 1222 of the apparatus 1204 in FIG. 12.

In one example, the ML-based displacement positioning may be UE-assisted displacement positioning initiated by the network entity. The UE may derive a set of displacement radio frequency fingerprint positioning (RFFP) measurements based on the set of RSs, and the UE may transmit, for the network entity, the set of displacement RFFP measurements. In some implementations, the information may include a capability of the UE to assist the ML-based displacement positioning and a list of displacement RFFPs that is able to be used for the ML-based displacement positioning at the network entity. In some implementations, a displacement RFFP measurement in the set of displacement RFFP measurements may correspond to a composition of a first measurement of a first RS transmitted from at least one TRP when the UE is at a first location, and a second RFFP measurement in the set of displacement RFFP measurements corresponds to a second measurement of a second RS transmitted from the at least one TRP when the UE is at a second location.

In another example, the ML-based displacement positioning may be performed by the UE. The UE may estimate a displacement of the UE based on the set of RSs using an ML model, and the UE may transmit, for the network entity, the estimated displacement of the UE. In some implementations, the information associated with the ML-based displacement positioning may include a capability of the UE to perform the ML-based displacement positioning. In some implementations, the information associated with the ML-based displacement positioning may include: a bandwidth capability of the UE, a buffering capability of the UE to observe multiple RS resources, one or more supported displacement RFFP types the UE is capable of constructing and reporting to the network entity, a measurement gap specification, or a combination thereof. In some implementations, the estimated displacement of the UE may include soft-information of the estimated displacement. In some implementations, to estimate the displacement of the UE based on the set of RSs using the ML model, the UE may transmit, based on the set of RSs, a set of displacement RFFP measurements for the ML model, where a first displacement RFFP measurement in the set of displacement RFFP measurements may correspond to a first measurement of a first RS transmitted from at least one TRP when the UE is at a first location, and a second displacement RFFP measurement in the set of displacement RFFP measurements may correspond to a second measurement of a second RS transmitted from the at least one TRP when the UE is at a second location, and the UE may receive, from the ML model, the displacement of the UE based on the set of displacement RFFP measurements.

In another example, the ML-based displacement positioning may be performed by the UE, and the UE may estimate a first displacement of the UE based on the set of RSs using an ML model, estimate a second displacement of the UE using a sensor, fuse the first displacement and the second displacement to obtain a fused displacement, and then transmit the fused displacement for the network entity.

In another example, the set of RSs may include: one or more PRSs, one or more CSI-RSs, one or more SSBs, or a combination thereof.

In another example, to receive the set of RSs associated with the ML-based displacement positioning based on the configuration, the UE may receive a first subset of RSs in the set of RSs from a first set of TRPs when the UE is at a first location; and the UE may receive a second subset of RSs in the set of RSs from a second set of TRPs when the UE is at a second location. In some implementations, the first set of TRPs and the second set of TRPs include at least one same TRP.

In another example, the UE may estimate a displacement of the UE using at least one sensor; and transmit, for the network entity, the estimated displacement of the UE, such as described in connection with FIG. 9. For example, the UE 902 may also be configured to report other displacement information obtained using non-RAT method(s) (e.g., using IMUs as described in connection with FIG. 5, motion sensors, etc.) along with RAT-based displacement information. The estimation of the displacement and/or the transmission of the estimated displacement may be performed by, e.g., the ML-based displacement positioning component 198, the application processor 1206, the cellular baseband processor 1224, one or more sensor modules 1218, and/or the transceiver(s) 1222 of the apparatus 1204 in FIG. 12.

In another example, the UE may train an ML model to perform the ML-based displacement positioning based on displacement RFFP measurements, such as described in connection with FIG. 8. For example, a UE may be configured to perform AI/ML position training and inference for RFFP. The training of the ML model may be performed by, e.g., the ML-based displacement positioning component 198, the application processor 1206, the cellular baseband processor 1224, and/or the transceiver(s) 1222 of the apparatus 1204 in FIG. 12. In some implementations, the UE may record second information from at least one sensor during reception of the set of RSs, where the ML model is further trained based on the second information.

In another example, the UE may derive a set of displacement radio frequency fingerprint positioning (RFFP) measurements based on the set of RSs, where the set of RFFP measurements corresponds to a composition of multiple measurements including: a CIR measurement, a CFR measurement, an RSRQ measurement, an RSRP measurement, a delay spread measurement, an angle spread measurement, an AoA measurement, an AoD measurement, a Doppler spread measurement, or a combination thereof, such as described in connection with FIG. 9. For example, the displacement RFFPs may be a composition of the first RF measurement and the second RF measurements, which may include: a CIR measurement, a CFR measurement, an RSRQ measurement, an RSRP measurement, a delay spread measurement, an angle spread measurement, an AoA measurement, an AoD measurement, a Doppler spread measurement, or a combination thereof. The derivation of the set of displacement RFFP measurements may be performed by, e.g., the ML-based displacement positioning component 198, the application processor 1206, the cellular baseband processor 1224, and/or the transceiver(s) 1222 of the apparatus 1204 in FIG. 12.

Figure 12:
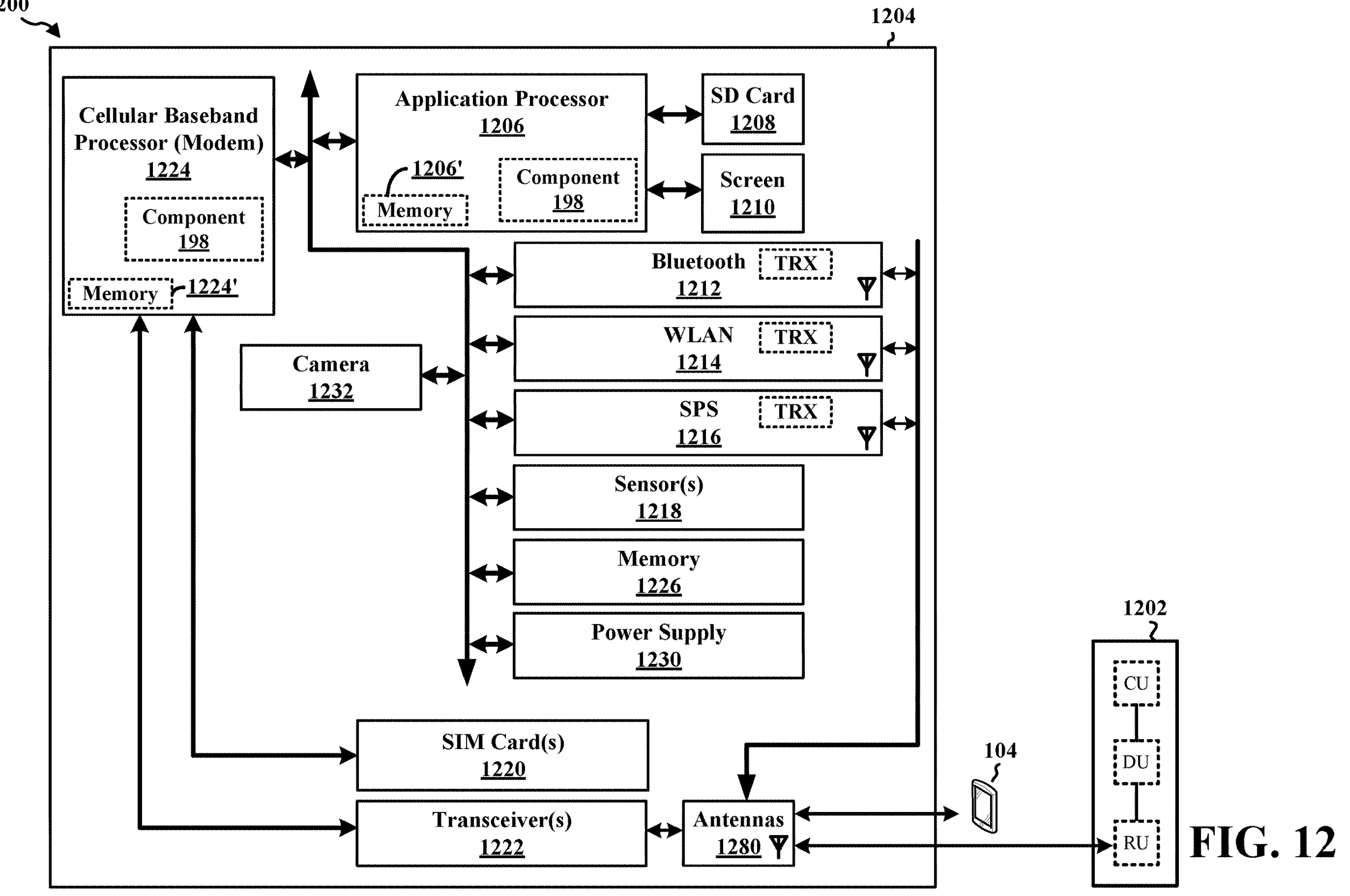
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the ML-based displacement positioning component 198 may be configured to receive, from a network entity, a request to report information associated with ML-based displacement positioning. The ML-based displacement positioning component 198 may also be configured to transmit, for the network entity based on the request, the information associated with the ML-based displacement positioning. The ML-based displacement positioning component 198 may also be configured to receive, from the network entity based on the information, a configuration for the ML-based displacement positioning. The ML-based displacement positioning component 198 may also be configured to receive, from at least one network node based on the configuration, a set of RSs associated with the ML-based displacement positioning. The ML-based displacement positioning component 198 may be within the cellular baseband processor 1224, the application processor 1206, or both the cellular baseband processor 1224 and the application processor 1206. The ML-based displacement positioning component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, may include means for receiving, from a network entity, a request to report information associated with ML-based displacement positioning. The apparatus 1204 may further include means for transmitting, for the network entity based on the request, the information associated with the ML-based displacement positioning. The apparatus 1204 may further include means for receiving, from the network entity based on the information, a configuration for the ML-based displacement positioning. The apparatus 1204 may further include means for receiving, from at least one network node based on the configuration, a set of RSs associated with the ML-based displacement positioning.

In one configuration, the configuration for the ML-based displacement positioning may be received in assistance data. In some implementations, the configuration may include: a time granularity for the set of RSs, a periodicity of reporting a displacement of the UE or a set of displacement RFFP measurements, a capability of the UE to adapt the time granularity for the set of RSs based on a speed of the UE, or a combination thereof.

In another configuration, the ML-based displacement positioning may be UE-assisted displacement positioning initiated by the network entity. The apparatus 1204 may further include means for deriving a set of displacement RFFP measurements based on the set of RSs, and means for transmitting, for the network entity, the set of displacement RFFP measurements. In some implementations, the information may include a capability of the apparatus 1204 to assist the ML-based displacement positioning and a list of displacement RFFPs that is able to be used for the ML-based displacement positioning at the network entity. In some implementations, a displacement RFFP measurement in the set of displacement RFFP measurements may correspond to a composition of a first measurement of a first RS transmitted from at least one TRP when the apparatus 1204 is at a first location, and a second RFFP measurement in the set of displacement RFFP measurements corresponds to a second measurement of a second RS transmitted from the at least one TRP when the apparatus 1204 is at a second location.

In another configuration, the ML-based displacement positioning may be performed by the apparatus 1204. The apparatus 1204 may further include means for estimating a displacement of the apparatus 1204 based on the set of RSs using an ML model, and means for transmitting, for the network entity, the estimated displacement of the apparatus 1204. In some implementations, the information associated with the ML-based displacement positioning may include a capability of the apparatus 1204 to perform the ML-based displacement positioning. In some implementations, the information associated with the ML-based displacement positioning may include: a bandwidth capability of the apparatus 1204, a buffering capability of the apparatus 1204 to observe multiple RS resources, one or more supported displacement RFFP types the apparatus 1204 is capable of constructing and reporting to the network entity, a measurement gap specification, or a combination thereof. In some implementations, the estimated displacement of the apparatus 1204 may include soft-information of the estimated displacement. In some implementations, the means for estimating the displacement of the apparatus 1204 based on the set of RSs using the ML model may include configuring the apparatus 1204 to transmit, based on the set of RSs, a set of displacement RFFP measurements for the ML model, where a first displacement RFFP measurement in the set of displacement RFFP measurements may correspond to a first measurement of a first RS transmitted from at least one TRP when the apparatus 1204 is at a first location, and a second displacement RFFP measurement in the set of displacement RFFP measurements may correspond to a second measurement of a second RS transmitted from the at least one TRP when the apparatus 1204 is at a second location, and to receive, from the ML model, the displacement of the apparatus 1204 based on the set of displacement RFFP measurements.

In another configuration, the ML-based displacement positioning may be performed by the apparatus 1204, and the apparatus 1204 may further include means for estimating a first displacement of the apparatus 1204 based on the set of RSs using an ML model, means for estimating a second displacement of the apparatus 1204 using a sensor, means for fusing the first displacement and the second displacement to obtain a fused displacement, and means for transmitting the fused displacement for the network entity.

In another configuration, the set of RSs may include: one or more PRSs, one or more CSI-RSs, one or more SSBs, or a combination thereof.

In another configuration, the means for receiving the set of RSs associated with the ML-based displacement positioning based on the configuration may include configuring the apparatus 1204 to receive a first subset of RSs in the set of RSs from a first set of TRPs when the apparatus 1204 is at a first location; and receive a second subset of RSs in the set of RSs from a second set of TRPs when the apparatus 1204 is at a second location. In some implementations, the first set of TRPs and the second set of TRPs include at least one same TRP.

In another configuration, the apparatus 1204 may further include means for estimating a displacement of the apparatus 1204 using at least one sensor; and means for transmitting, for the network entity, the estimated displacement of the apparatus 1204.

In another configuration, the apparatus 1204 may further include means for training an ML model to perform the ML-based displacement positioning based on displacement RFFP measurements. In some implementations, the apparatus 1204 may further include means for recording second information from at least one sensor during reception of the set of RSs, where the ML model is further trained based on the second information.

In another configuration, the apparatus 1204 may further include means for deriving a set of displacement RFFP measurements based on the set of RSs, where the set of RFFP measurements corresponds to a composition of multiple measurements including: a CIR measurement, a CFR measurement, an RSRQ measurement, an RSRP measurement, a delay spread measurement, an angle spread measurement, an AoA measurement, an AoD measurement, a Doppler spread measurement, or a combination thereof, such as described in connection with FIG. 9. For configuration, the displacement RFFPs may be a composition of the first RF measurement and the second RF measurements, which may include: a CIR measurement, a CFR measurement, an RSRQ measurement, an RSRP measurement, a delay spread measurement, an angle spread measurement, an AoA measurement, an AoD measurement, a Doppler spread measurement, or a combination thereof. The derivation of the set of displacement RFFP measurements may be performed by, e.g., the ML-based displacement positioning component 198, the application processor 1206, the cellular baseband processor 1224, and/or the transceiver(s) 1222 of the apparatus 1204 in FIG. 12.

The means may be the ML-based displacement positioning component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
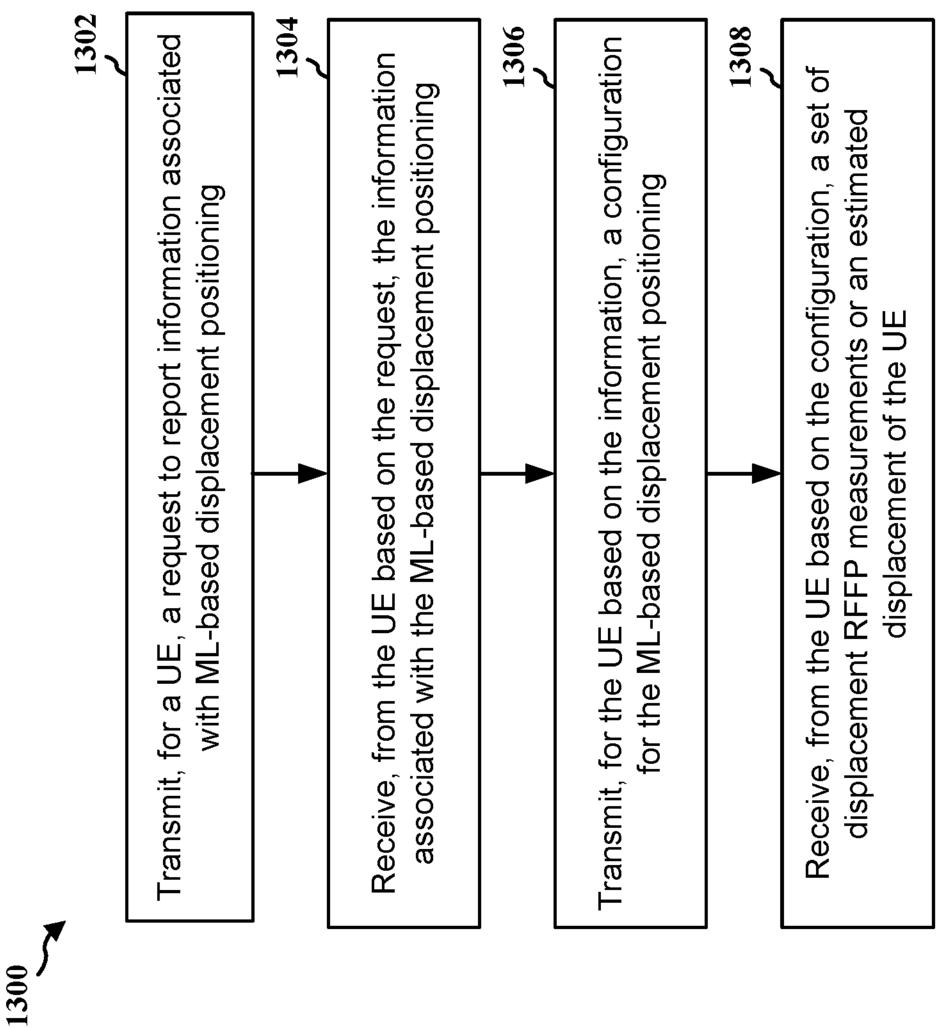
FIG. 13 is a flowchart of a method of wireless communication.

FIG. 13 is a flowchart 1300 of a method of wireless communication. The method may be performed by a network entity (e.g., the one or more location servers 168; the location server 706; the LMF 908; the network entity 1460). The method may enable the network entity to configure a UE to estimate the displacement of the UE based on measuring wireless signals, or to transmit measurements associated with estimating the displacement of the UE to the network entity.

At 1302, the network entity may transmit, for a UE, a request to report information associated with machine learning (ML)-based displacement positioning, such as described in connection with FIG. 9. For example, at 910, the LMF 908 may request the UE 902 to indicate its capability to support or perform AI/ML-based displacement positioning, and/or its capability to report intermediate information (e.g., reference signal measurements, RF fingerprint(s) captured, etc.) that may be used for performing the AI/ML-based displacement positioning at the LMF 908. The transmission of the request to report information associated with ML-based displacement positioning may be performed by, e.g., the ML-based displacement positioning configuration component 199, the network processor 1412, and/or the network interface 1480 of the network entity 1460 in FIG. 14.

At 1304, the network entity may receive, from the UE based on the request, the information associated with the ML-based displacement positioning, such as described in connection with FIG. 9. For example, at 910, based on the request, the LMF 908 may receive a UE capability messaging from the UE 902 that indicates the UE 902's capability to support or perform AI/ML-based displacement positioning, and/or the UE 902's capability to report intermediate information that may be used for performing the AI/ML-based displacement positioning at the LMF 908. The reception of the information associated with the ML-based displacement positioning may be performed by, e.g., the ML-based displacement positioning configuration component 199, the network processor 1412, and/or the network interface 1480 of the network entity 1460 in FIG. 14.

At 1306, the network entity may transmit, for the UE based on the information, a configuration for the ML-based displacement positioning, such as described in connection with FIG. 9. For example, at 912, the LMF 908 may transmit configurations to the UE 902 for the UE-assisted ML displacement positioning or the UE-based ML displacement positioning. The transmission of the configuration for the ML-based displacement positioning may be performed by, e.g., the ML-based displacement positioning configuration component 199, the network processor 1412, and/or the network interface 1480 of the network entity 1460 in FIG. 14.

At 1308, the network entity may receive, from the UE based on the configuration, a set of displacement radio frequency fingerprint positioning (RFFP) measurements or an estimated displacement of the UE, such as described in connection with FIG. 9. For example, at 914, for the UE-assisted ML displacement positioning, the UE 902 may derive displacement RFFP measurements based on the PRSs, and report the derived displacement RFFP measurements to the LMF 908. On the other hand, for the UE-based ML displacement positioning, the UE 902 may conduct inference of the displacement information of the UE 902, and the UE 902 may report its displacement information to the LMF 908. The reception of the set of displacement RFFP measurements or the estimated displacement of the UE may be performed by, e.g., the ML-based displacement positioning configuration component 199, the network processor 1412, and/or the network interface 1480 of the network entity 1460 in FIG. 14.

In one example, the ML-based displacement positioning may be performed by the network entity, and the network entity may receive the set of displacement RFFP measurements. The network entity may estimate a displacement of the UE based on the set of displacement RFFP measurements using an ML model. In some implementations, the information may include a capability of the UE to assist the ML-based displacement positioning and a list of displacement RFFPs that is able to be used for the ML-based displacement positioning at the network entity. In some implementations, a displacement RFFP measurement in the set of displacement RFFP measurements may correspond to composition of a first measurement of a first RS transmitted from at least one TRP when the UE is at a first location, and a second RFFP measurement in the set of displacement RFFP measurements may correspond to a second measurement of a second RS transmitted from the at least one TRP when the UE is at a second location.

In another example, the ML-based displacement positioning may be initiated by the UE, and the network entity may receive the estimated displacement of the UE. In some implementations, the information associated with the ML-based displacement positioning may include a capability of the UE to perform the ML-based displacement positioning. In some implementations, the information associated with the ML-based displacement positioning may include: a bandwidth capability of the UE, a buffering capability of the UE to observe multiple RS resources, one or more supported displacement RFFP types the UE is capable of constructing and reporting to the network entity, a measurement gap specification, or a combination thereof. In some implementations, the estimated displacement of the UE may include soft-information of the estimated displacement.

In another example, the network entity may receive the set of RFFP measurements from the UE, and the network entity may transmit the set of displacement RFFP measurements for an ML model, where a first displacement RFFP measurement in the set of displacement RFFP measurements may correspond to a first measurement of a first RS transmitted from at least one TRP when the UE is at a first location, and a second displacement RFFP measurement in the set of displacement RFFP measurements may correspond to a second measurement of a second RS transmitted from the at least one TRP when the UE is at a second location, and the network entity may receive, from the ML model, a computed displacement of the UE based on the set of displacement RFFP measurements.

In another example, the configuration for the ML-based displacement positioning may be transmitted in assistance data, and where the configuration may include: a time granularity for a set of RSs for the UE to obtain displacement information, a periodicity of reporting a displacement of the UE or a second set of displacement radio frequency fingerprint positioning (RFFP) measurements, a capability of the UE to adapt the time granularity for the set of RSs based on a speed of the UE, or a combination thereof. In some implementations, the set of RSs may include: one or more PRSs, one or more CSI-RSs, one or more SSBs, or a combination thereof.

In another example, the network entity may transmit, for the UE, a first set of RSs via a first set TRPs when the UE is at a first location, and transmit, for the UE, a second set of RSs via a second set of TRPs when the UE is at a second location. In some implementations, the first set of TRPs and the second set of TRPs include at least one same TRP.

In another example, the network entity may train an ML model to perform the ML-based displacement positioning based on a second set of displacement RFFP measurements.

In another example, the set of RFFP measurements may correspond to a composition of multiple measurements including: a CIR measurement, a CFR measurement, an RSRQ measurement, an RSRP measurement, a delay spread measurement, an angle spread measurement, an AoD measurement, a Doppler spread measurement, or a combination thereof.

Figure 14:
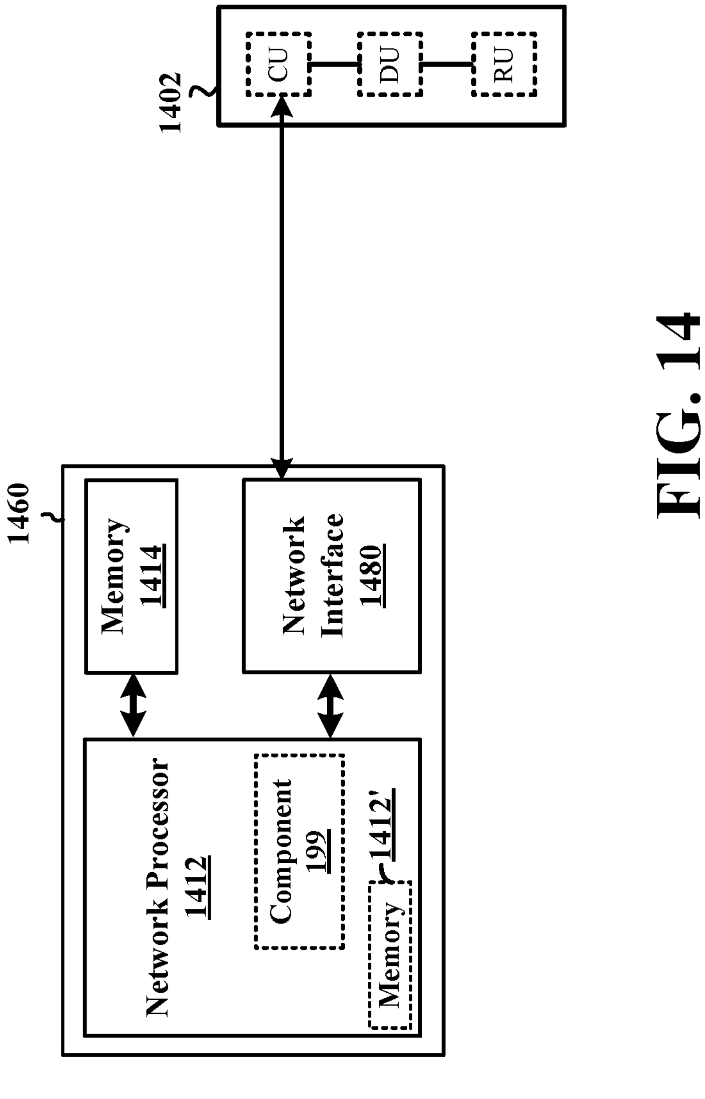
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the ML-based displacement positioning configuration component 199 may be configured to transmit, for a UE, a request to report information associated with ML-based displacement positioning. The ML-based displacement positioning configuration component 199 may also be configured to receive, from the UE based on the request, the information associated with the ML-based displacement positioning. The ML-based displacement positioning configuration component 199 may also be configured to transmit, for the UE based on the information, a configuration for the ML-based displacement positioning. The ML-based displacement positioning configuration component 199 may also be configured to receive, from the UE based on the configuration, a set of displacement RFFP measurements or an estimated displacement of the UE.

The ML-based displacement positioning configuration component 199 may be within the processor 1412. The ML-based displacement positioning configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for transmitting, for a UE, a request to report information associated with ML-based displacement positioning. The network entity 1460 may further include means for receiving, from the UE based on the request, the information associated with the ML-based displacement positioning. The network entity 1460 may further include means for transmitting, for the UE based on the information, a configuration for the ML-based displacement positioning. The network entity 1460 may further include means for receiving, from the UE based on the configuration, a set of displacement RFFP measurements or an estimated displacement of the UE.

In one configuration, the ML-based displacement positioning may be performed by the network entity, and the network entity 1460 may further include means for receiving the set of displacement RFFP measurements. The network entity 1460 may further include means for estimating a displacement of the UE based on the set of displacement RFFP measurements using an ML model. In some implementations, the information may include a capability of the UE to assist the ML-based displacement positioning and a list of displacement RFFPs that is able to be used for the ML-based displacement positioning at the network entity. In some implementations, a displacement RFFP measurement in the set of displacement RFFP measurements may correspond to composition of a first measurement of a first RS transmitted from at least one TRP when the UE is at a first location, and a second RFFP measurement in the set of displacement RFFP measurements may correspond to a second measurement of a second RS transmitted from the at least one TRP when the UE is at a second location.

In another configuration, the ML-based displacement positioning may be initiated by the UE, and the network entity 1460 may further include means for receiving the estimated displacement of the UE. In some implementations, the information associated with the ML-based displacement positioning may include a capability of the UE to perform the ML-based displacement positioning. In some implementations, the information associated with the ML-based displacement positioning may include: a bandwidth capability of the UE, a buffering capability of the UE to observe multiple RS resources, one or more supported displacement RFFP types the UE is capable of constructing and reporting to the network entity, a measurement gap specification, or a combination thereof. In some implementations, the estimated displacement of the UE may include soft-information of the estimated displacement.

In another configuration, the network entity 1460 may further include means for receiving the set of RFFP measurements from the UE, and means for transmitting the set of displacement RFFP measurements for an ML model, where a first displacement RFFP measurement in the set of displacement RFFP measurements may correspond to a first measurement of a first RS transmitted from at least one TRP when the UE is at a first location, and a second displacement RFFP measurement in the set of displacement RFFP measurements may correspond to a second measurement of a second RS transmitted from the at least one TRP when the UE is at a second location, and means for receiving, from the ML model, a computed displacement of the UE based on the set of displacement RFFP measurements.

In another configuration, the configuration for the ML-based displacement positioning may be transmitted in assistance data, and where the configuration may include: a time granularity for a set of RSs for the UE to obtain displacement information, a periodicity of reporting a displacement of the UE or a second set of displacement RFFP measurements, a capability of the UE to adapt the time granularity for the set of RSs based on a speed of the UE, or a combination thereof. In some implementations, the set of RSs may include: one or more PRSs, one or more CSI-RSs, one or more SSBs, or a combination thereof.

In another configuration, the network entity 1460 may further include means for transmitting, for the UE, a first set of RSs via a first set TRPs when the UE is at a first location, and means for transmitting, for the UE, a second set of RSs via a second set of TRPs when the UE is at a second location. In some implementations, the first set of TRPs and the second set of TRPs include at least one same TRP.

In another configuration, the network entity 1460 may further include means for training an ML model to perform the ML-based displacement positioning based on a second set of displacement RFFP measurements.

In another configuration, the set of RFFP measurements may correspond to a composition of multiple measurements including: a CIR measurement, a CFR measurement, an RSRQ measurement, an RSRP measurement, a delay spread measurement, an angle spread measurement, an AoD measurement, a Doppler spread measurement, or a combination thereof.

The means may be the ML-based displacement positioning configuration component 199 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving, from a network entity, a request to report information associated with machine learning (ML)-based displacement positioning; transmitting, for the network entity based on the request, the information associated with the ML-based displacement positioning; receiving, from the network entity based on the information, a configuration for the ML-based displacement positioning; and receiving, from at least one network node based on the configuration, a set of reference signals (RSs) associated with the ML-based displacement positioning.

Aspect 2 is the method of aspect 1, where the ML-based displacement positioning is UE-assisted displacement positioning initiated by the network entity, the method further including: deriving a set of displacement radio frequency fingerprint positioning (RFFP) measurements based on the set of RSs; and transmitting, for the network entity, the set of displacement RFFP measurements.

Aspect 3 is the method of aspect 2, where the information includes a capability of the UE to assist the ML-based displacement positioning and a list of displacement RFFPs that is able to be used for the ML-based displacement positioning at the network entity.

Aspect 4 is the method of aspect 2, where a displacement RFFP measurement in the set of displacement RFFP measurements corresponds to a composition of a first measurement of a first reference signal (RS) transmitted from at least one transmission reception point (TRP) when the UE is at a first location, and a second RFFP measurement in the set of displacement RFFP measurements corresponds to a second measurement of a second RS transmitted from the at least one TRP when the UE is at a second location.

Aspect 5 is the method of any of aspects 1 to 4, where the ML-based displacement positioning is performed by the UE, the method further including: estimating a displacement of the UE based on the set of RSs using an ML model; and transmitting, for the network entity, the estimated displacement of the UE.

Aspect 6 is the method of aspect 5, where the information associated with the ML-based displacement positioning includes a capability of the UE to perform the ML-based displacement positioning.

Aspect 7 is the method of aspect 5, where the information associated with the ML-based displacement positioning includes: a bandwidth capability of the UE, a buffering capability of the UE to observe multiple reference signal (RS) resources, one or more supported displacement RFFP types the UE is capable of constructing and reporting to the network entity, a measurement gap specification, or a combination thereof.

Aspect 8 is the method of aspect 5, where the estimated displacement of the UE includes soft-information of the estimated displacement.

Aspect 9 is the method of aspect 5, where estimating the displacement of the UE based on the set of RSs using the ML model includes: transmitting, based on the set of RSs, a set of displacement radio frequency fingerprint positioning (RFFP) measurements for the ML model, where a first displacement RFFP measurement in the set of displacement RFFP measurements corresponds to a first measurement of a first reference signal (RS) transmitted from at least one transmission reception point (TRP) when the UE is at a first location, and a second displacement RFFP measurement in the set of displacement RFFP measurements corresponds to a second measurement of a second RS transmitted from the at least one TRP when the UE is at a second location; and receiving, from the ML model, the displacement of the UE based on the set of displacement RFFP measurements.

Aspect 10 is the method of any of aspects 1 to 9, where the configuration for the ML-based displacement positioning is received in assistance data, and where the configuration includes: a time granularity for the set of RSs, a periodicity of reporting a displacement of the UE or a set of displacement radio frequency fingerprint positioning (RFFP) measurements, a capability of the UE to adapt the time granularity for the set of RSs based on a speed of the UE, or a combination thereof.

Aspect 11 is the method of any of aspects 1 to 10, further including: estimating a displacement of the UE using at least one sensor; and transmitting, for the network entity, the estimated displacement of the UE.

Aspect 12 is the method of any of aspects 1 to 11, where the ML-based displacement positioning is performed by the UE, the method further including: estimating a first displacement of the UE based on the set of RSs using an ML model; estimating a second displacement of the UE using a sensor; fusing the first displacement and the second displacement to obtain a fused displacement; and transmitting the fused displacement for the network entity.

Aspect 13 is the method of any of aspects 1 to 12, where the set of RSs includes: one or more positioning reference signals (PRSs), one or more channel state information reference signals (CSI-RSs), one or more synchronization signal blocks (SSBs), or a combination thereof.

Aspect 14 is the method of any of aspects 1 to 12, where receiving the set of RSs associated with the ML-based displacement positioning based on the configuration includes: receiving a first subset of RSs in the set of RSs from a first set of transmission reception points (TRPs) when the UE is at a first location; and receiving a second subset of RSs in the set of RSs from a second set of TRPs when the UE is at a second location.

Aspect 15 is the method of aspect 14, where the first set of TRPs and the second set of TRPs include at least one same TRP.

Aspect 16 is the method of any of aspects 1 to 15, further including: training an ML model to perform the ML-based displacement positioning based on displacement radio frequency fingerprint positioning (RFFP) measurements.

Aspect 17 is the method of aspect 16, further including: recording second information from at least one sensor during reception of the set of RSs, where the ML model is further trained based on the second information.

Aspect 18 is the method of any of aspects 1 to 17, further including: deriving a set of displacement RFFP measurements based on the set of RSs, where the set of radio frequency fingerprint positioning (RFFP) measurements corresponds to a composition of multiple measurements including: a channel impulse response (CIR) measurement, a channel frequency response (CFR) measurement, a reference signal received quality (RSRQ) measurement, a reference signal received power (RSRP) measurement, a delay spread measurement, an angle spread measurement, an angle of arrival (AoA) measurement, an angle of departure (AoD) measurement, a Doppler spread measurement, or a combination thereof.

Aspect 19 is an apparatus for wireless communication at a user equipment (UE), including: a memory; and at least one processor coupled to the memory and, based at least in part on information stored in the memory, the at least one processor is configured to implement any of aspects 1 to 18.

Aspect 20 is the apparatus of aspect 19, further including at least one of a transceiver or an antenna coupled to the at least one processor.

Aspect 21 is an apparatus for wireless communication including means for implementing any of aspects 1 to 18.

Aspect 22 is a computer-readable medium (e.g., a non-transitory computer-readable medium) storing computer executable code, where the code when executed by a processor causes the processor to implement any of aspects 1 to 18.

Aspect 23 is a method of wireless communication at a network entity, including: transmitting, for a user equipment (UE), a request to report information associated with machine learning (ML)-based displacement positioning; receiving, from the UE based on the request, the information associated with the ML-based displacement positioning; transmitting, for the UE based on the information, a configuration for the ML-based displacement positioning; and receiving, from the UE based on the configuration, a set of displacement radio frequency fingerprint positioning (RFFP) measurements or an estimated displacement of the UE.

Aspect 24 is the method of aspect 23, where the ML-based displacement positioning is performed by the network entity, and where the network entity receives the set of displacement RFFP measurements, the method further including: estimating a displacement of the UE based on the set of displacement RFFP measurements using an ML model.

Aspect 25 is the method of aspect 24, where the information includes a capability of the UE to assist the ML-based displacement positioning and a list of displacement RFFPs that is able to be used for the ML-based displacement positioning at the network entity.

Aspect 26 is the method of aspect 24, where a displacement RFFP measurement in the set of displacement RFFP measurements corresponds to composition of a first measurement of a first reference signal (RS) transmitted from at least one transmission reception point (TRP) when the UE is at a first location, and a second RFFP measurement in the set of displacement RFFP measurements corresponds to a second measurement of a second RS transmitted from the at least one TRP when the UE is at a second location.

Aspect 27 is the method of any of aspects 23 to 26, where the ML-based displacement positioning is initiated by the UE, and where the network entity receives the estimated displacement of the UE.

Aspect 28 is the method of aspect 27, where the information associated with the ML-based displacement positioning includes a capability of the UE to perform the ML-based displacement positioning.

Aspect 29 is the method of aspect 27, where the information associated with the ML-based displacement positioning includes: a bandwidth capability of the UE, a buffering capability of the UE to observe multiple reference signal (RS) resources, one or more supported displacement RFFP types the UE is capable of constructing and reporting to the network entity, a measurement gap specification, or a combination thereof.

Aspect 30 is the method of aspect 27, where the estimated displacement of the UE includes soft-information of the estimated displacement.

Aspect 31 is the method of any of aspects 23 to 30, where the network entity receives the set of RFFP measurements from the UE, the method further including: transmitting the set of displacement RFFP measurements for an ML model, where a first displacement RFFP measurement in the set of displacement RFFP measurements corresponds to a first measurement of a first reference signal (RS) transmitted from at least one transmission reception point (TRP) when the UE is at a first location, and a second displacement RFFP measurement in the set of displacement RFFP measurements corresponds to a second measurement of a second RS transmitted from the at least one TRP when the UE is at a second location; and receiving, from the ML model, a computed displacement of the UE based on the set of displacement RFFP measurements.

Aspect 32 is the method of any of aspects 23 to 31, where the configuration for the ML-based displacement positioning is transmitted in assistance data, and where the configuration includes: a time granularity for a set of reference signals (RSs) for the UE to obtain displacement information, a periodicity of reporting a displacement of the UE or a second set of displacement radio frequency fingerprint positioning (RFFP) measurements, a capability of the UE to adapt the time granularity for the set of RSs based on a speed of the UE, or a combination thereof.

Aspect 33 is the method of aspect 32, where the set of RSs includes: one or more positioning reference signals (PRSs), one or more channel state information reference signals (CSI-RSs), one or more synchronization signal blocks (SSBs), or a combination thereof.

Aspect 34 is the method of any of aspects 23 to 33, further including: transmitting, for the UE, a first set of reference signals (RSs) via a first set of transmission reception points (TRPs) when the UE is at a first location; and transmitting, for the UE, a second set of RSs via a second set of TRPs when the UE is at a second location.

Aspect 35 is the method of aspect 34, where the first set of TRPs and the second set of TRPs include at least one same TRP.

Aspect 36 is the method of any of aspects 23 to 35, further including: training an ML model to perform the ML-based displacement positioning based on a second set of displacement radio frequency fingerprint positioning (RFFP) measurements.

Aspect 37 is the method of any of aspects 23 to 36, where the set of RFFP measurements corresponds to a composition of multiple measurements including: a channel impulse response (CIR) measurement, a channel frequency response (CFR) measurement, a reference signal received quality (RSRQ) measurement, a reference signal received power (RSRP) measurement, a delay spread measurement, an angle spread measurement, an angle of departure (AoD) measurement, a Doppler spread measurement, or a combination thereof.

Aspect 38 is an apparatus for wireless communication at a network entity, including: a memory; and at least one processor coupled to the memory and, based at least in part on information stored in the memory, the at least one processor is configured to implement any of aspects 23 to 37.

Aspect 39 is the apparatus of aspect 38, further including at least one of a transceiver or an antenna coupled to the at least one processor.

Aspect 40 is an apparatus for wireless communication including means for implementing any of aspects 23 to 37.

Aspect 41 is a computer-readable medium (e.g., a non-transitory computer-readable medium) storing computer executable code, where the code when executed by a processor causes the processor to implement any of aspects 23 to 37.

What is claimed is:

1. An apparatus for wireless communication at a user equipment (UE), comprising:

at least one memory; and at least one processor coupled to the at least one memory and, the at least one processor is configured to:

receive, from a network entity, a request to report information associated with machine learning (ML)-based displacement positioning, wherein the ML-based displacement positioning comprises estimating a displacement of the UE between at least two points in time using at least one ML model based on an aggregation or composition of radio frequency fingerprint (RFFP) measurements of reference signals (RSs) received at the UE at the at least two points in time;

transmit, for the network entity based on the request, the information associated with the ML-based displacement positioning;

receive, from the network entity based on the information, a configuration for the ML-based displacement positioning; and receive, from at least one network node based on the configuration, a set of RSs associated with the ML-based displacement positioning.

2. The apparatus of claim 1, wherein the ML-based displacement positioning is UE-assisted displacement positioning initiated by the network entity, and wherein the at least one processor is further configured to:

derive a set of RFFP measurements based on the set of RSs; and transmit, for the network entity, the set of displacement RFFP measurements.

3. The apparatus of claim 2, wherein the information includes a capability of the UE to assist the ML-based displacement positioning and a list of displacement RFFPs that is able to be used for the ML-based displacement positioning at the network entity.

4. The apparatus of claim 2, wherein a displacement RFFP measurement in the set of displacement RFFP measurements corresponds to the composition of a first measurement of a first RS transmitted from at least one transmission reception point (TRP) when the UE is at a first location, and a second RFFP measurement in the set of displacement RFFP measurements corresponds to a second measurement of a second RS transmitted from the at least one TRP when the UE is at a second location.

5. The apparatus of claim 1, wherein the ML-based displacement positioning is performed by the UE, and wherein the at least one processor is further configured to:

estimate the displacement of the UE based on the set of RSs using an ML model; and transmit, for the network entity, the estimated displacement of the UE.

6. The apparatus of claim 5, wherein the information associated with the ML-based displacement positioning includes a capability of the UE to perform the ML-based displacement positioning.

7. The apparatus of claim 5, wherein the information associated with the ML-based displacement positioning includes:

a bandwidth capability of the UE, a buffering capability of the UE to observe multiple RS resources, one or more supported displacement RFFP types the UE is configured to construct and report to the network entity, a measurement gap specification, or a combination thereof.

8. The apparatus of claim 5, wherein the estimated displacement of the UE includes soft-information of the estimated displacement.

9. The apparatus of claim 5, wherein to estimate the displacement of the UE based on the set of RSs using the ML model, the at least one processor is configured to:

transmit, based on the set of RSs, a set of displacement RFFP measurements for the ML model, wherein a first displacement RFFP measurement in the set of displacement RFFP measurements corresponds to a first measurement of a first RS transmitted from at least one transmission reception point (TRP) when the UE is at a first location, and a second displacement RFFP measurement in the set of displacement RFFP measurements corresponds to a second measurement of a second RS transmitted from the at least one TRP when the UE is at a second location; and receive, from the ML model, the displacement of the UE based on the set of displacement RFFP measurements.

10. The apparatus of claim 1, wherein the at least one processor is configured to receive the ML-based displacement positioning in assistance data, and wherein the assistance data includes:

a time granularity for the set of RSs, a periodicity of reporting the displacement of the UE or a set of displacement RFFP measurements, a capability of the UE to adapt the time granularity for the set of RSs based on a speed of the UE, or a combination thereof.

11. The apparatus of claim 1, wherein the at least one processor is further configured to:

estimate the displacement of the UE using at least one sensor; and transmit, for the network entity, the estimated displacement of the UE.

12. The apparatus of claim 1, wherein the ML-based displacement positioning is performed by the UE, and wherein the at least one processor is further configured to:

estimate a first displacement of the UE based on the set of RSs using an ML model;

estimate a second displacement of the UE using a sensor;

fuse the first displacement and the second displacement to obtain a fused displacement; and transmit the fused displacement for the network entity.

13. The apparatus of claim 1, wherein the set of RSs includes:

one or more positioning reference signals (PRSs), one or more channel state information reference signals (CSI-RSs), one or more synchronization signal blocks (SSBs), or a combination thereof.

14. The apparatus of claim 1, wherein to receive the set of RSs associated with the ML-based displacement positioning based on the configuration, the at least one processor is configured to:

receive a first subset of RSs in the set of RSs from a first set of transmission reception points (TRPs) when the UE is at a first location; and receive a second subset of RSs in the set of RSs from a second set of TRPs when the UE is at a second location.

15. The apparatus of claim 14, where the first set of TRPs and the second set of TRPs include at least one same TRP.

16. The apparatus of claim 1, wherein the at least one processor is further configured to:

train an ML model to perform the ML-based displacement positioning based on displacement RFFP measurements.

17. The apparatus of claim 16, wherein the at least one processor is further configured to:

record second information from at least one sensor during reception of the set of RSs, wherein the ML model is further trained based on the second information.

18. The apparatus of claim 1, wherein the at least one processor is further configured to:

derive a set of displacement RFFP measurements based on the set of RSs, wherein the set of RFFP measurements corresponds to a composition of multiple measurements including:

a channel impulse response (CIR) measurement, a channel frequency response (CFR) measurement, a reference signal received quality (RSRQ) measurement, a reference signal received power (RSRP) measurement, a delay spread measurement, an angle spread measurement, an angle of arrival (AoA) measurement,
an angle of departure (AoD) measurement,
a Doppler spread measurement, or
a combination thereof.

19. A method of wireless communication at a user equipment (UE), comprising:

receiving, from a network entity, a request to report information associated with machine learning (ML)-based displacement positioning, wherein the ML-based displacement positioning comprises estimating a displacement of the UE between at least two points in time using at least one ML model based on an aggregation or composition of radio frequency fingerprint (RFFP) measurements of reference signals (RSs) received at the UE at the at least two points in time;

transmitting, for the network entity based on the request, the information associated with the ML-based displacement positioning;

receiving, from the network entity based on the information, a configuration for the ML-based displacement positioning; and receiving, from at least one network node based on the configuration, a set of RSs associated with the ML-based displacement positioning.

* * * * *